US006944165B2

(12) United States Patent

Fujiyama et al.

(10) Patent No.: US 6,944,165 B2
(45) Date of Patent: Sep. 13, 2005

(54) METHOD AND APPARATUS FOR TRANSMITTING DATA IN A LINEAR-TYPE OR RING-TYPE NETWORK

(75) Inventors: Takehiko Fujiyama, Kawasaki (JP); Kenzo Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 851 days.

(21) Appl. No.: 09/819,195

(22) Filed: Mar. 28, 2001

(65) Prior Publication Data

US 2002/0064163 A1 May 30, 2002

(30) Foreign Application Priority Data

Nov. 30, 2000 (JP) ....................................... 2000-366048

(51) Int. Cl.[7] ................................................ H04L 12/56

(52) U.S. Cl. ........................ 370/400; 370/443; 370/462

(58) Field of Search ................................ 370/389, 400, 370/401, 404, 405, 406, 424, 443, 444, 447, 452, 461, 462, 216, 217, 218, 221, 222, 223, 224, 225, 227, 228, 242, 249, 258, 395.42, 477

(56) References Cited

U.S. PATENT DOCUMENTS 6,005,869 A * 12/1999 Sakai et al. ................. 370/452
6,032,185 A * 2/2000 Asano ........................ 709/227
6,202,082 B1 * 3/2001 Tomizawa et al. .......... 370/403
6,751,213 B1 * 6/2004 Sun et al. ................... 370/352

FOREIGN PATENT DOCUMENTS

JP 53-145406 A 12/1978
JP 04-117042 A 4/1992
JP 05-183564 A 7/1993
JP 11-163910 A 6/1999

* cited by examiner

*Primary Examiner*—Chi Pham
*Assistant Examiner*—Anh-Vu H Ly
(74) *Attorney, Agent, or Firm*—Katten Muchin Rosenman LLP

(57) ABSTRACT

A method and an apparatus for transmitting data in a linear-type or ring-type network structured by a plurality of nodes and both-way transmission lines each connecting between adjacent nodes includes that each node operates as a left TE, a right TE, or an IE. The left and right TEs prepare token packets each including a transmission right and packet trailers each including data packet storage area. The left TE transmits the packet trailers on a right direction line of the both-way transmission line.

10 Claims, 26 Drawing Sheets

RING CONNECTION NETWORK

LINEAR CONNECTION NETWORK

STRUCTURE OF LOGICAL COMMUNICATION PATH IN RING CONNECTION NETWORK

STRUCTURE OF LOGICAL COMMUNICATION PATH IN LINEAR CONNECTION NETWORK

Fig.12

| In=#1 \ In=#0 | DATA FRAME HAS NOT ARRIVED | "MASTER-INFORMING" OF MASTER NODE "m" HAS ARRIVED | "MASTER-INFORMING" AND "MASTER-INVITING" OF MASTER NODE "m" HAVE ARRIVED |
|---|---|---|---|
| DATA FRAME HAS NOT ARRIVED | NODE IS CHANGED TO "MASTER" AND TRANSMITS "MASTER-INFORMING" AND "MASTER-INVITING" TO LINES (#0,#1) (RAS-r1,RAS-r4) | NODE IS CHANGED TO "MASTER" AND TRANSMITS "MASTER-INFORMING" AND "MASTER-INVITING" TO LINE (#0) (RAS-r1,RAS-r4) | NODE IS CHANGED TO "MASTER" AND TRANSMITS "MASTER-INFORMING" AND "MASTER-INVITING" TO LINE (#0) (RAS-r1,RAS-r4) |
| "MASTER-INFORMING" OF MASTER NODE "n" HAS ARRIVED | NODE IS CHANGED TO "MASTER" AND TRANSMITS "MASTER-INFORMING" AND "MASTER-INVITING" TO LINE (#1) (RAS-r1,RAS-r4) | if m=n≤<br>address of its own node<br>then,node is changed to master,and transmits "master-informing" (RAS-r3)<br>if m=n><br>address of its own node<br>then,node is changed to slave (RAS-r3)<br>if m≠n<br>then,node is changed to slave (RAS-r2) | NODE IS CHANGED TO "MASTER" AND TRANSMITS "MASTER-INFORMING" (RAS-r5,RAS-r7) |
| "MASTER-INFORMING" AND "MASTER-INVITING" OF MASTER NODE "n" HAVE ARRIVED | NODE IS CHANGED TO "MASTER" AND TRANSMITS "MASTER-INFORMING" AND "MASTER-INVITING" TO LINE (#1) (RAS-r1,RAS-r4) | NODE IS CHANGED TO "MASTER" AND TRANSMITS "MASTER-INFORMING" (RAS-r5,RAS-r7) | NODE IS CHANGED TO "SLAVE" (RAS-r6) |

NODE DISCONNECTED
NODE RECOVERED
A
B
C
D
P
a
b
d
bm
dm

LOOP-BACK CONNECTION
AT ABNORMAL STATE

USUALLY,
COMMUNICATED BY
ONLY LINE #0

IN THE CASE OF DATA BEING
TRANSMITTED FROM
"C" TO "A"

METHOD AND APPARATUS FOR TRANSMITTING DATA IN A LINEAR-TYPE OR RING-TYPE NETWORK

BACKGROUND OF THE INVENTION

1. Field of the Invention

The present invention relates to a method and an apparatus for transmitting data in a linear-type or ring-type network. In particular, in a linear-type or ring-type network used in a local area, the present invention includes a method and an apparatus that have a RAS (Reliability Availability and Serviceability) function which adaptively switches connection paths when a failure has occurred in these networks. Further, the present invention includes a method and an apparatus that can effectively utilize transmission capacity and can realize the data communication in which the importance of real-time characteristic for transmitting an image is considered.

2. Description of the Related Art

An IP (Internet Protocol) network that can realize various data communication methods has, in general, a basic structure that is formed by a topology of a mesh structure. However, even if the IP network has the topology of the mesh structure, there are cases in which the IP network is not suitable and should not be used in view of its purpose. For example, the linear-type or ring-type network can be preferably and easily utilized as a network system that is used for mutually supervising among a plurality of checking points provided within the local area on a road or river.

There are, however, some problems in a conventional linear-type or ring-type network as explained below. That is, there are problems of effective utilization of transmission capacity, effective data transmission having good real-time characteristic, transmission efficiency when a failure has occurred, etc. These problems will be explained in detail, with reference to Figures, below.

SUMMARY OF THE INVENTION

The object of the invention is to provide a method and an apparatus in a linear-type or ring-type network, which can realize effective utilization of transmission capacity in the two-way transmission line without delay of data transmission, and can realize simultaneously much data communication among a plurality of nodes in accordance with an improved real-time characteristic for transmitting an image.

In accordance with a first aspect of the present invention, there is provided a method for transmitting data in a linear-type or ring-type network structured by a plurality of nodes and two-way transmission lines each connecting between adjacent nodes;

wherein each node operates as a left terminal equipment, a right terminal equipment, or an intermediate equipment; the left and right terminal equipments prepare token packets each including a transmission right and packet trailers each including data packet storage area; the left terminal equipment transmits the packet trailers on a right direction line of the two-way transmission line; and the right terminal equipment transmits the packet trailers on a left direction line of the two-way transmission line;

wherein when a request for transmission for transmitting data packets to the right direction is generated, each intermediate equipment writes the request for transmission in the token packet of the packet trailer on the left direction line; and when the request for transmission for transmitting data packets to the left direction is generated, each intermediate equipment writes the request for transmission in the token packet of the packet trailer on the right direction line; and each intermediate equipment performs the request for transmission;

wherein the left and right terminal equipments prepare the packet trailer having data packet storage area to ensure a reservation area for the intermediate equipment which transmitted the request for transmission, based on the request for transmission of the each intermediate equipment which is written in the token packet of the packet trailer transmitted from the opposite terminal equipment; and wherein intermediate equipment which performed the request for transmission temporarily stores the data packet in the reservation area of the packet trailer, and transmits the data packet to a destination node. In accordance with a second aspect of the present invention, there is provided a transmission apparatus provided in each of a plurality of nodes which are connected through two-way lines in a linear-type or ring-type network;

wherein the transmission apparatus in each node comprises a function to operate as either a terminal equipment or an intermediate equipment;

wherein the transmission apparatus comprises means for preparing packet trailers each having a storage area to store token packets and data packets and for transmitting the packet trailers on the two-way transmission line when the transmission apparatus operates as a terminal equipment, and means for receiving the packet trailers transmitted from the opposite terminal equipment and delivered on the two-way transmission line and for terminating the packet trailers; further, the transmission apparatus comprises means for storing a transmission right in the token packet, in which the transmission right is applied to the intermediate equipment which performed the request for transmission, based on a request for transmission of each intermediate equipment written in the packet trailer transmitted from the opposite terminal equipment on the way of delivery, and for transmitting the packet trailers including the token packets having the transmission right to the opposite terminal equipment; and wherein the transmission apparatus further comprises means for writing the request for transmission in the token packet of the packet trailer directed to the direction opposite to the data transmitting direction, when the transmission apparatus operates as the intermediate equipment, and when the request for transmission of the data packet is generated; and means for storing the transmission data in the packet trailer in accordance with the transmission right of the token packet including in the packet trailer directed to the same direction as the data transmission, and for transmitting the data packet to the node of destination.

BRIEF DESCRIPTION OF THE DRAWINGS

FIG. 12 is a table for switching between a master node and a slave node in accordance with switching rules;

DESCRIPTION OF THE PREFERRED EMBODIMENTS

Before describing the preferred embodiments, a convention art and its problems will be explained in detail with reference to attached drawings.

Figures 18A, 18B, 18C:
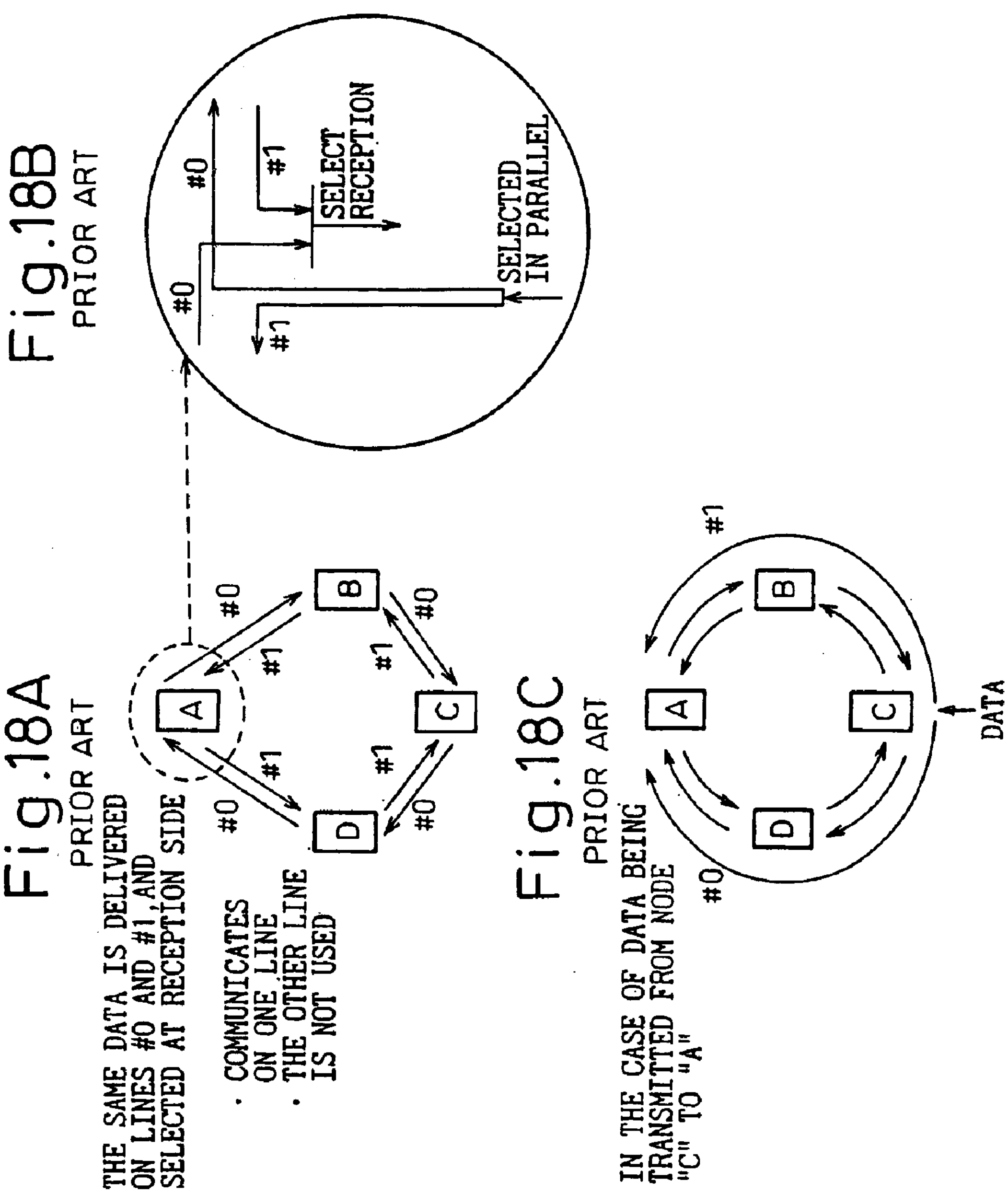
FIGS. 18A to 18C show parallel-transmitting/receiving selective transmission systems with a RAS function in a conventional ring-type network.
Figure 19A:
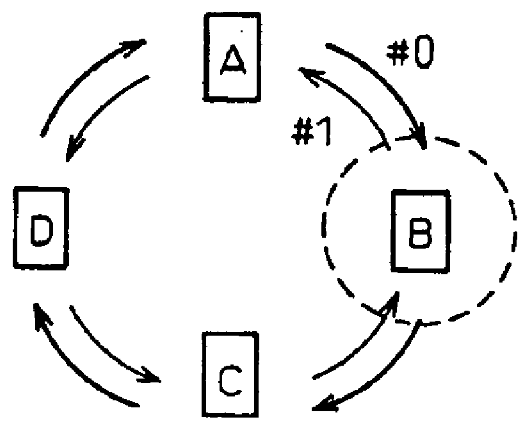
FIGS. 19A to 19B show loop-back transmission systems with the RAS function in the conventional ring-type network.
Figure 19B:
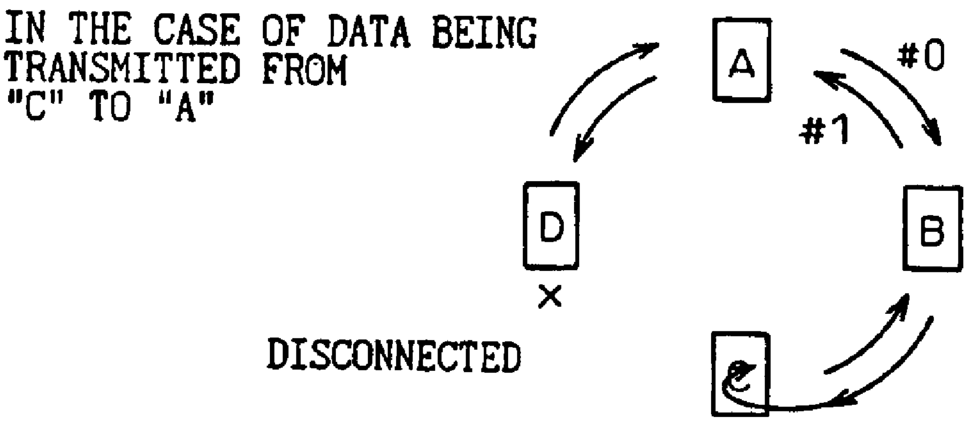

FIGS. 18A to 18C show parallel-transmitting/receiving selective transmission systems with the RAS function in a conventional ring-type network, and FIGS. 19A to 19B show loop-back transmission systems with the RAS function in the conventional ring-type network. As shown in these drawings, there are two transmission systems, i.e., the parallel transmitting/receiving selective transmission system with the RAS function and the loop-back transmission system with the RAS function, in the conventional ring-type network.

As shown in FIG. 18A, the ring-type network has a ring transmission line #0 in a clockwise direction, and has the ring transmission line #1 in an anti-clockwise direction. Each node A to D is connected to an adjacent node one another on both transmission lines #0 and #1 so as to form the ring-type network.

As shown in FIG. 18B, each node A to D transmits data in parallel on both transmission lines #0 and #1 by attaching a node address of a destination, and receives data from transmission lines #0 and #1. Further, each node selects one of the received data and takes the selected data into its own node.

In FIG. 18C, this is the case of transmission of data from the node C to the node A. The data is transmitted from the node C to the node A through both transmission lines #0 and #1. The node A receives the data from the transmission lines #0 and #1, and selects one of the transmission lines in order to take the data.

The node A switches to another transmission line when the data received from one transmission line is abnormal. As explained above, by providing the clockwise transmission line #0 and the anti-clockwise transmission line #1, it is possible to realize the data communication having high reliability (i.e., RAS function) when the failure has occurred on one of the ring transmission lines.

In the loop-back transmission system shown in FIGS. 19A and 19B, as well as the above parallel transmitting/receiving selective transmission system shown in FIGS. 18A to 18C, each node A to D is connected to another node, one after another, through the clockwise and anti-clockwise transmission lines #0 and #1, and one of the transmission lines #0 and #1 is used in an normal state. For example, as shown in FIG. 19A, the looped transmission line is formed by the clockwise transmission line #0 to perform the data transmission.

Further, as shown in FIG. 19B, when the failure has occurred on the line between the nodes C and D, the clockwise transmission line #0 is looped-back to the anti-clockwise transmission line #1 at the node C, and the anti-clockwise transmission line #1 is looped-back to the clockwise transmission line #0 at the node D. As a result, it is possible to change the looped transmission line.

Accordingly, even if a failure has occurred between the nodes C and D, it is possible to perform the data communication having high reliability with the RAS function among nodes A to D by using both clockwise and anti-clockwise transmission lines #0 and #1.

FIGS. 20A to 20E are views for explaining a token-ring method in a conventional art, and FIGS. 21A to 21E are views for explaining an early-token release method in a conventional art. As shown in these drawings, there are two access methods in the conventional ring network. In the token ring method, a token is a particular data packet to give a transmission right to any node, and the token is cycled on the ring network. The node that received the token acquires the transmission right so that it is possible to transmit data.

Figure 20B:
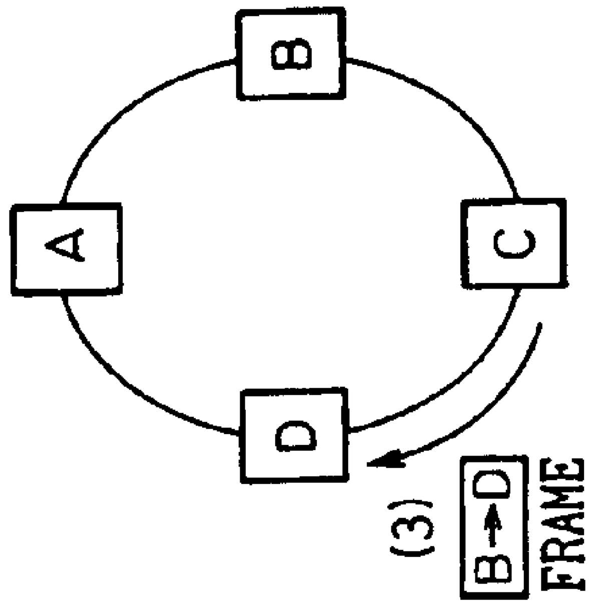
FIGS. 20A to 20E are views for explaining a token-ring method in the conventional art.
Figure 20A:
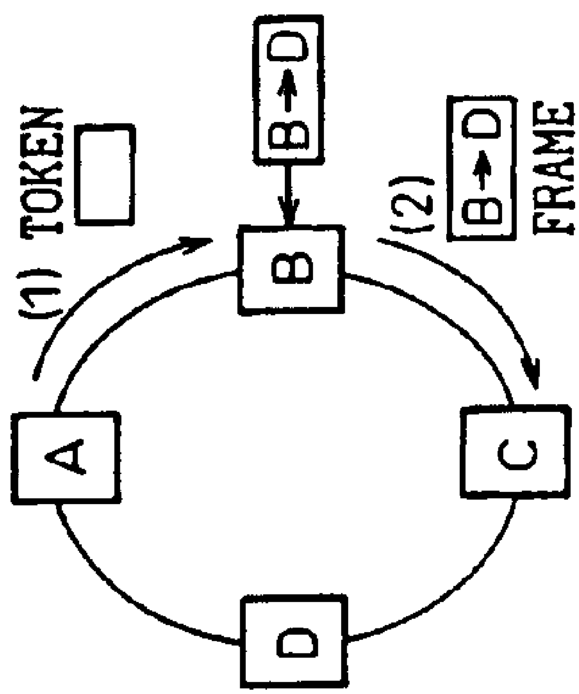
Figure 20E:
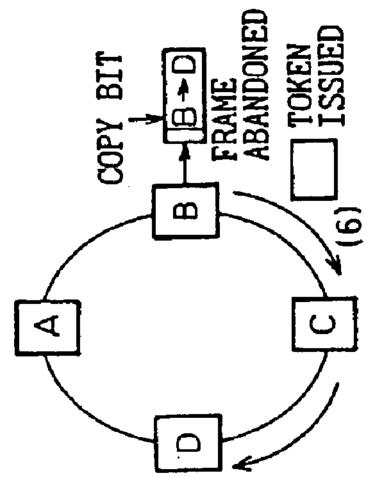

As shown in FIG. 20A, when the node B receives the token, the node B transmits the transmission data [B→D] to the node D. As shown in FIG. 20B, when the transmission data [B→D] arrives at the node D through the ring transmission line, the node D takes the transmission data [B→D] as shown in FIG. 20C, and transmits data in which a copy bit (c) "1" is added to the transmission data [B→D] in order to inform the reception of the data [B→D] to the sending side.

Figure 20D:
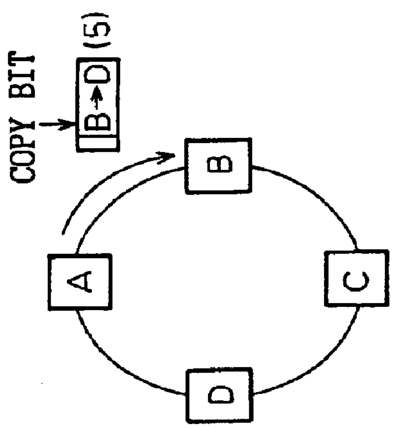
Figure 20C:
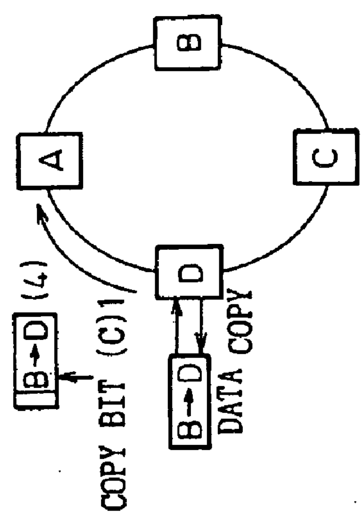

When the data formed by the data [B→D] and the copy bit "1" arrives at the node B of the sending side as shown in FIG. 20D, the node B confirms normal transmission of the transmission data from the destination by receiving the data [B→D] having the copy bit "1". Further, as shown in FIG. 20E, the node B abandons the data [B→D] having the copy bit "1", and issues the token to the next node C.

Figure 21B:
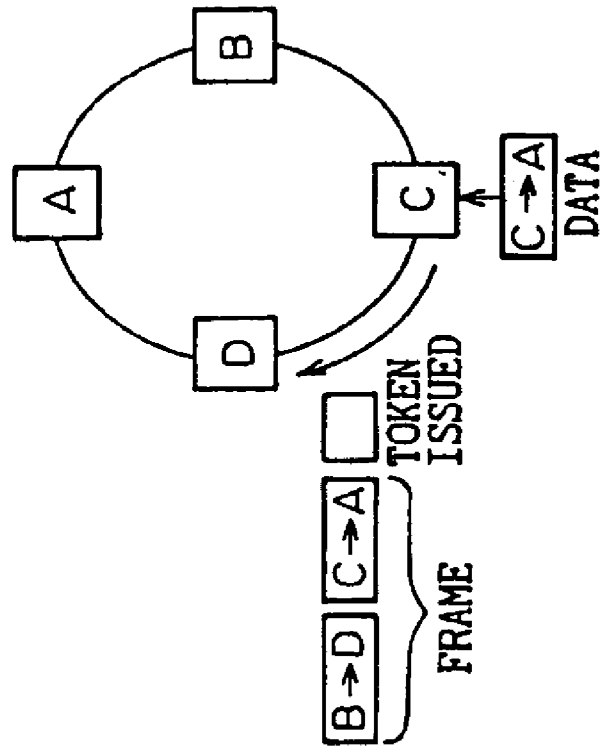
FIGS. 21A to 21E are views for explaining an early-token release method in the conventional art.
Figure 21A:
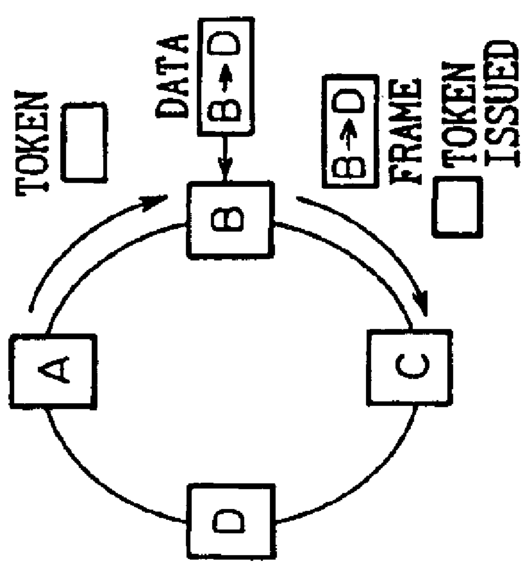

As shown in FIGS. 21A to 21E, in the early token release method, when each node receives the token and acquires the transmission right, it transmits the transmission data adding the token to a frame of the transmission data. That is, as shown in FIG. 21A, for example, when the node B receives the token, the node B transmits the transmission data adding the token to the frame on the ring transmission line when there is the transmission data [B→D] to be transmitted to the node D.

When the transmission data [B→D] and token arrive at the next node C, and when there is another transmission data at the node C, the node C transmits the data frames of the transmission data [B→D] and [C→A] with the token on the ring transmission line as shown in FIG. 21B.

Figure 21D:
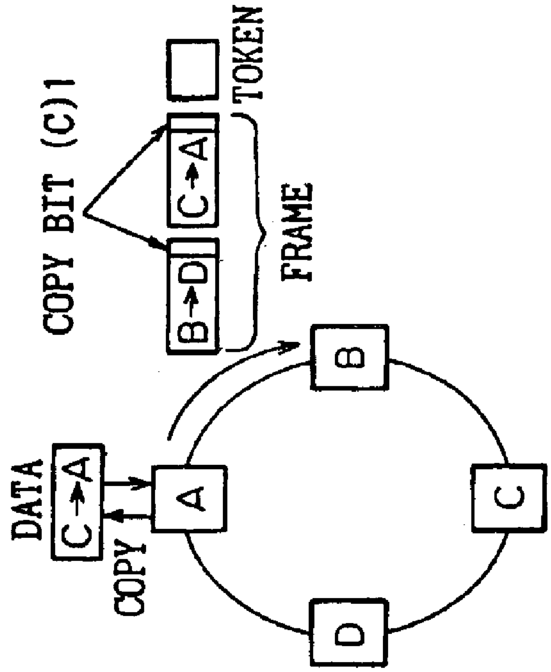
Figure 21C:
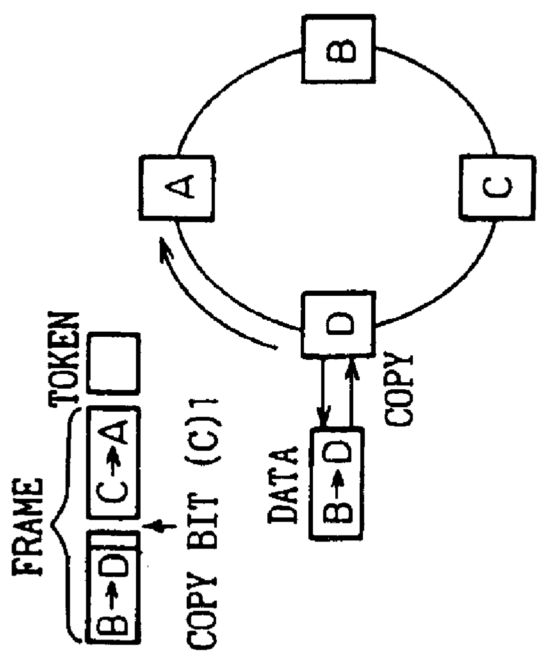

When the node D receives the data frames, the node D takes only the data [B→D] in which the destination indicates the node D as shown in FIG. 21C. Further, the node D adds the copy bit (c) "1" to the data [B→D], and transmits the data [B→D] with the copy bit (c) "1", and the data [C→A] with the token on the ring transmission line.

When the node A receives the data frames, the node A takes only the data [C→A] in which the destination indicates the node A as shown in FIG. 21D. Further, the node A adds the copy bit (c) "1" to the data [C→A], and transmits frames of the data [B→D] and [C→A] with the copy bit (c) "1" and the token on the ring transmission line.

Figure 21E:
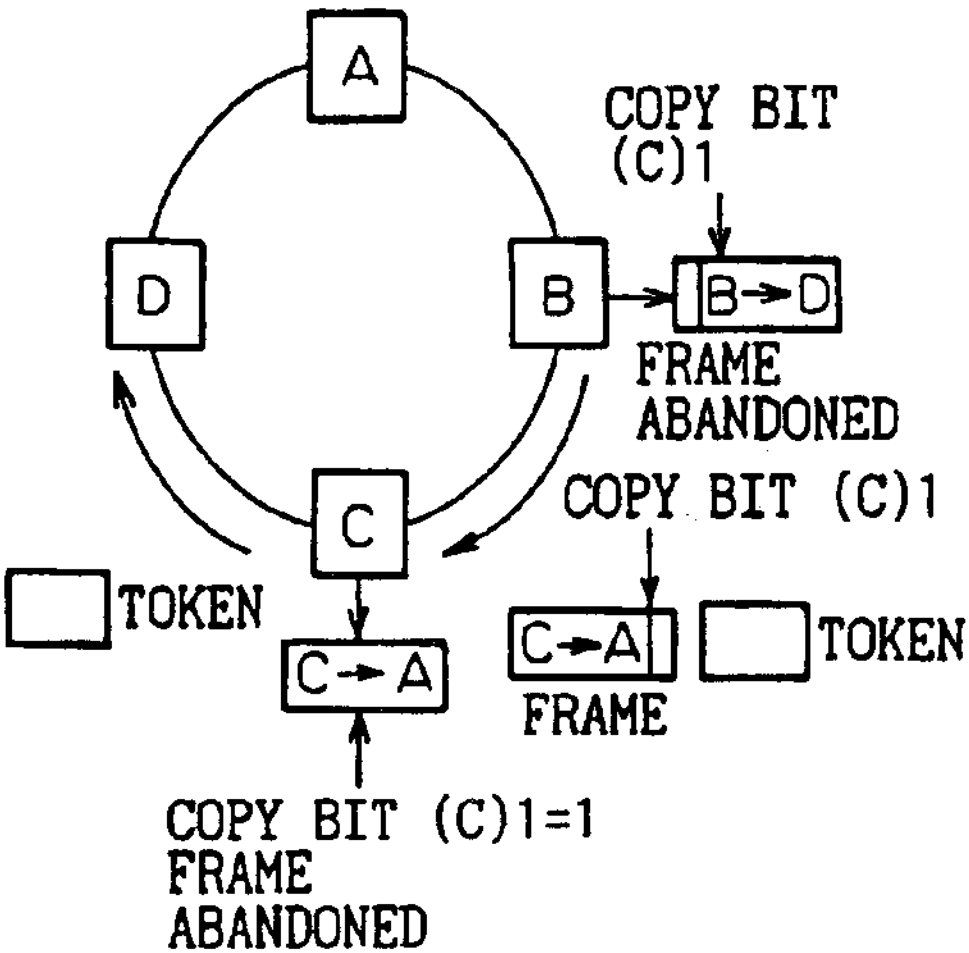

When the node B receives the data [B→D] with the copy bit (c) "1" as shown in FIG. 21E, the node B confirms normal transmission of the data to the node D of the destination, and abandons the transmission data [B→D]. Further, the node B transmits the data [C→A] with the copy bit (c) "1" and the token on the ring transmission line.

When the node C receives the data [C→A] with the copy bit (c) "1", the node C confirms normal transmission of the data to the node A of the destination. Further, the node C abandons the transmission data [C→A] and transmits the token to the next node on the ring transmission line.

There are, however, some problems in the above conventional art shown in FIGS. 18 to 21, as explained in detail below.

First, in the ring-type network shown in FIGS. 18A to 18C, since one of the ring transmission lines is always used as stand-by line, effective data communication is substantially performed only to the transmission capacity of one transmission line. Accordingly, it is impossible to perform the data communication that fully utilizes the transmission capacity of two ring transmission lines by using the other ring transmission line as the other data communication.

In particular, in the case of transmission of a synchronous frame multiplexed with data in a SDH (Synchronous Digital Hierarchy) network, since a time-slot is fixedly assigned to each node, an area to be used has been already occupied even if real data is not transmitted. Accordingly, it is obvious that the transmission capacity of the network is not effectively utilized in the SDH.

Second, in the loop-back type ring network shown in FIGS. 19A to 19B, as well as the ring-type network shown in FIGS. 18A to 18C, all of the data communication are substantially performed only by the transmission capacity of one ring transmission line. Accordingly, it is impossible to perform the data communication by fully utilizing the transmission capacity of two ring transmission lines.

Further, when the failure occurs, the distance of the loop transmission line, which is formed by loop-back connection, is increased so that a delay occurs in the data transmission. Further, in FIG. 19B, for example, when the data is transferred from the node B to the node A, useless data for the node C must be temporarily transferred from the node B to the node C so that the transfer efficiency becomes worse.

Further, in the access method shown in FIGS. 20A to 20E and 21A to 21E, the transmission right is controlled by cycling the token on the ring transmission line in order to prevent collision when the transmission data is transmitted from each node. However, in the token-ring method shown in FIGS. 20A to 20E, only one node can transmit once the transmission data on the transmission line.

On the other hand, in the early token release method shown in FIGS. 21A to 21E, it is possible to transmit the transmission data from a plurality of nodes on the transmission line. However, the time required for transmission is defined by a time when the token is cycled one round on the ring so that the transmission efficiency becomes worse at the node at which much data are transmitted.

As the access method which can effectively transmit much data, there is a known timed-token-protocol method in which one node can continue to transmit the data within a maximum time when the token is cycled one round on the ring. However, in both access methods, the end (abandonment) of the transmission data on the ring network is performed by confirming sending back of the transmission data having the copy bit in the node of the sending side. Accordingly, it is necessary to deliver the useless data in addition to the useful data on the transmission line from the node of the sending side to the node of the destination.

Further, only one ring transmission line is utilized in both access methods. That is, one of the ring transmission lines is used as the stand-by line in the above double ring network, and only one ring transmission line is effectively utilized at the normal time on the data communication. Furthermore, both access methods have no access control method corresponding to a priority order of the transmission data or a class of quality of serve (QOS). Accordingly, it is necessary to control the above priority order or the QOS on an upper layer.

The present invention aims to resolve the above conventional problems and provide a transmission apparatus and a method for transmitting data in a linear-type or ring-type network. According to the present invention, the transmission capacity of two two-way transmission lines is fully utilized in order to effectively perform data communication without delay in the data transfer. Further, in the present invention, it is possible to simultaneously perform data communication among a plurality of nodes and to effectively perform media communication and various data transfers in which the real-time response is very important.

The preferred embodiments of the present invention will be explained in detail with reference to the attached drawings.

FIGS. 1A to 1D are views for explaining one example of the linear-type or ring-type network. In a ring-connected network shown in FIG. 1A, it is assumed that a node A is defined as a terminal equipment (below TE) used as a right TE or a left TE, and remaining nodes B to D are defined as intermediate equipments (below IE). An adjacent node is connected to another by a two-way transmission line.

The node A can be operated as the right TE or the left TE. Further, the node A issues a token packet to apply a transmission right to another node, and transmits a master-frame "a" representing that its own node is operated as the TE (i.e., a master equipment).

Figure 1A:
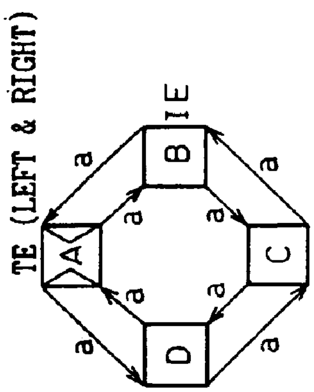
FIGS. 1A to 1D are views for explaining one example of a linear-type or ring-type network.
Figure 1B:
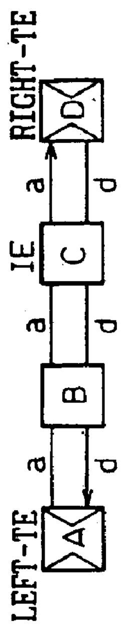

In a linear-connected network shown in FIG. 1B, it is assumed that, for example, the node A is defined as the left TE, the node D is defined as the right TE, and the nodes B and C are defined as the IE. Further, the adjacent node is connected one another by the two-way transmission line.

In FIG. 1B, the node A is operated as the left TE, and the node D is operated as the right TE. The nodes A and D issue the token packet to apply the transmission right to another node. Further, the node A transmits the master-frame "a" representing that its own node is operated as the master, and the node D transmits the master-frame "d" representing that its own node is operated as the master.

Figure 1C:
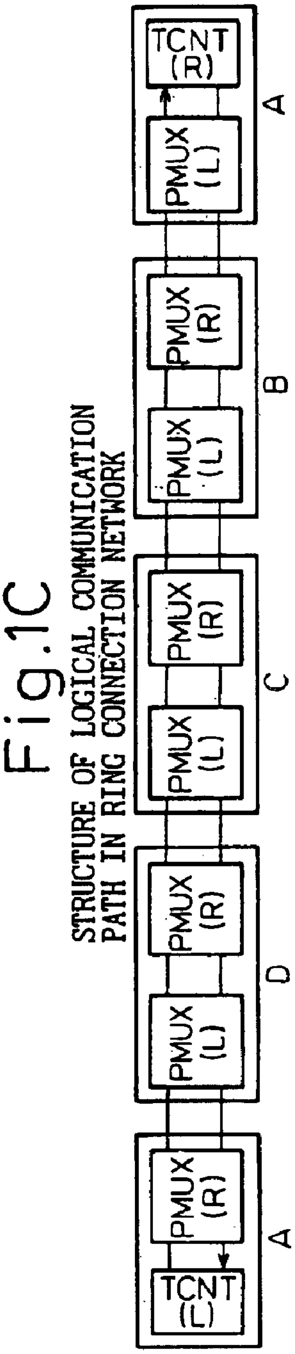
Figure 1D:
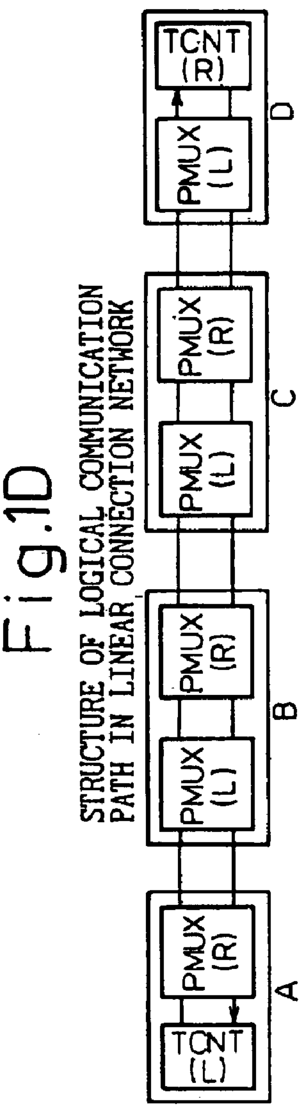

FIG. 1C shows a structure of a logical communication line of the ring-connected network in FIG. 1A, and FIG. 1D shows the logical communication line of the linear-connected network in FIG. 1B. As shown in these drawings, each node A to D includes a left packet multiplexing unit (below PMUX-L) and a right packet multiplexing unit (below PMUX-R).

The PMUX-L and PMUX-R in the right TE are connected to a token controller TCNT. The PMUX-L and PMUX-R in the IE are connected to the corresponding PMUX-R and PMUX-L in each adjacent node in order to relay the packet data two ways.

Figure 2A:
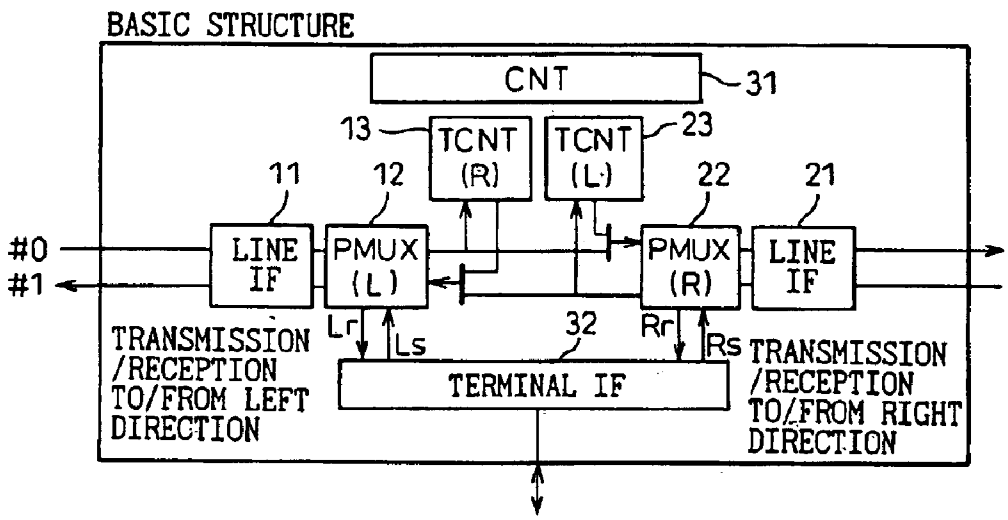
FIGS. 2A to 2C show structures of a transmission apparatus at each node.
Figure 2B:
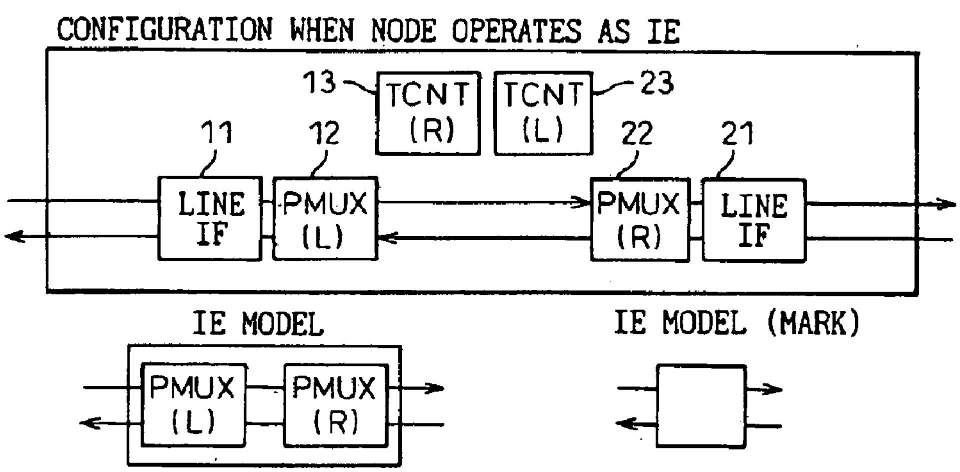
Figure 2C:
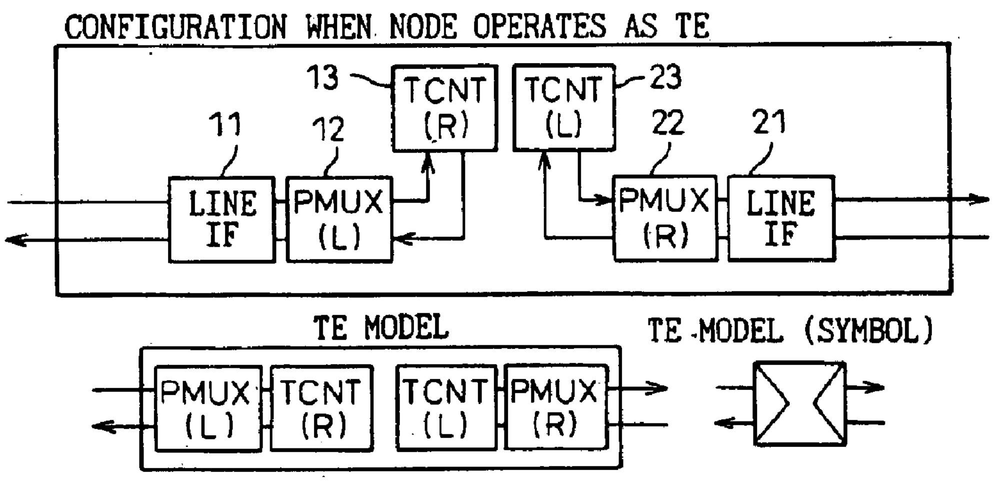

FIGS. 2A to 2C show structures of a transmission apparatus at each node. A basic structure of the transmission apparatus is shown in FIG. 2A. The transmission apparatus includes a left line interface (IF) 11, a right line interface (IF) 21, a left packet multiplexing unit (PMUX-L) 12, a right packet multiplexing unit (PMUX-R) 22, a left token controller (TCNT-R) 13, a left token controller (TCNT-L) 23, a controller (CNT) 31 and a terminal interface 32.

The left line IF 11 and right line IF 21 have interface functions for interfacing signals on the right-direction transmission line #0 and the left-direction transmission line #1. The left line IF 11 is connected to the PMUX-L 12, and the right line IF 21 is connected to the PMUX-R 22, in order to relay the signals.

The PMUX-L 12 outputs the packet, which is output from the left line IF 11 on the right transmission line #0, to the terminal IF 13. When the transmission apparatus is the terminal equipment (TE), the packet is output to the right token controller TCNT-R 13. When the transmission apparatus is the intermediate equipment (IE), the packet is output to the PMUX-R 22.

Further, the PMUX-L 12 outputs the packet from the TCNT-R 13 (when the transmission apparatus is the TE) to the left line IF 11 multiplexed with the packet from the terminal IF 32. On the other hand, the PMUX-L 12 outputs the packet from the PMUX-R 22 (when the transmission apparatus is the IE) to the left line 11 multiplexed with the packet from the terminal IF 32.

Further, the PMUX-R 22 outputs the packet from the right line IF 21 on the left transmission line #1 to the terminal IF 32. Further, when the transmission apparatus is the TE, the PMUX-R 22 outputs the packet to the TCNT-L 23. When the transmission apparatus is the IE, the PMUX-R 22 outputs the packet to the PMUX-L 12.

Further, the PMUX-R 22 outputs the packet from the TCNT-L 23 (when the transmission apparatus is the TE) to the right line IF 21 multiplexed with the packet from the terminal IF 32. On the other hand, the PMUX-R 22 outputs the packet from the PMUX-L 12 (when the transmission apparatus is the IE) to the right line IF 21 multiplexed with the packet from the terminal IF 32.

FIG. 2B shows a structure in which the transmission apparatus operates as the IF. The PMUX-L 12 and the PMUX-R 22 are directly connected, and the TCNT-R 13 and the TCNT-L 23 are disconnected. In the lower portion of FIG. 2B, the IE model is shown in the left, and a simplified symbol of the IE model is shown in the right.

FIG. 2C shows a structure in which the transmission apparatus operates as the TE. The PMUX-L 12 is connected to the TCNT-R 13, and the PMUX-R 22 is connected to the TCNT-L 23. In the lower portion of the FIG. 2C, the TE model is shown in the left, and the simplified symbol of the TE model is shown in the right.

Figure 3A:
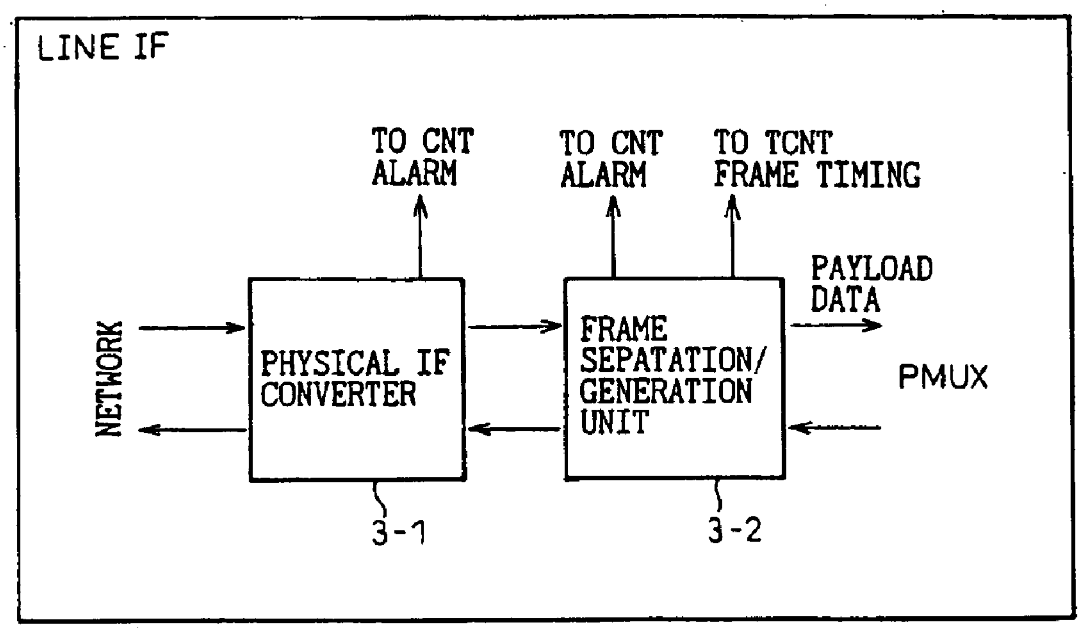
FIG. 3A shows a structure of a line interface (IF) unit.
Figure 3B:
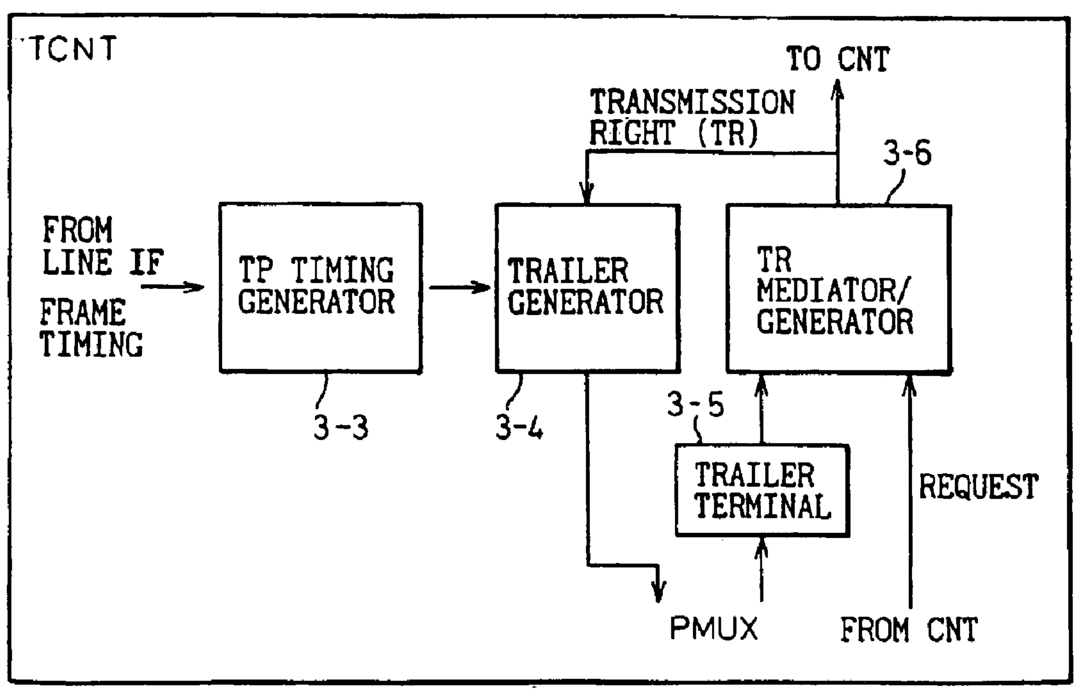
FIG. 3B shows a structure of a token controller (TCNT)

FIG. 3A shows a structure of a line interface (IF) unit, and FIG. 3B shows a structure of a token controller (TCNT). The line IF unit includes a function of an interface corresponding to various kinds of network lines. Further, the line IF unit has an input unit from the network line and an output unit thereto, and has a physical interface (IF) converter 3-1 corresponding to the network line.

The physical IF converter 3-1 supervises an alarm signal on a physical layer. When it detects the alarm signal on the physical layer, it transmits an alarm information to a control unit CNT. On the other hand, a separation unit of a frame separating/generating unit 3-2 receives the packet from the physical IF converter 3-1, and eliminates a header and a frame signal corresponding to protocols of the network lines from the packet. Further, the separation unit delivers only pure communication data (i.e., a payload data) to the PMUX unit.

Further, the separation unit of the frame separating/generating unit 3-2 supervises the alarm signal in the packet, and informs the alarm information to the controller CNT when the alarm signal is detected. When the controller CNT receives this alarm information (i.e., a failure of a reception frame, a failure of transmission, etc.,), the controller CNT determines whether the transmission apparatus should be the IF, or the TE, in accordance with the following rule.

A generation unit of the frame separating/generating unit 3-2 forms a packet frame by adding the header, etc., to the packet from the PMUX unit, corresponding to the network line, and delivers the packet frame to the physical IF converter 3-1.

The token controller TCNT functions when the transmission apparatus becomes the TE. As shown in FIG. 3B, the TCNT includes a token packet (TP) timing generator 3—3, a trailer generator 3-4, a trailer terminal 3-5, and a transmission-right (TR) mediator/generator 3-6.

The token TP timing generator 3—3 generates a transmission timing signal of the token packet based on a frame timing signal from the line IF unit, and outputs the timing signal to the trailer generator 3-4.

The trailer generator 3-4 generates the packet trailer including the token packet TP that applies the transmission right based on the information of the transmission right sent from the TR mediator/generator 3-6, and outputs the packet trailer to the PMUX unit.

The trailer terminal 3-5 receives the packet trailer through the PMUX unit and terminates it. In this case, the packet trailer is transmitted from the trailer generator of another TE opposite to the TE through the network line, and a transmission right (TR) request and the transmission data are stored into the packet trailer at each node. Further, after the trailer terminal 3-5 sends the TR request, which is transmitted from the node of each IE and stored in the packet trailer, to the TR mediator/generator 3-6, all of the packet trailers are abandoned.

The TR mediator/generator 3-6 issues the transmission right (corresponding to the token) and mediates the TR request in accordance with the TR request of the node of each IE informed by the trailer generator 3-5 and the data transmission request of its own node informed by the controller CNT.

Figure 4:
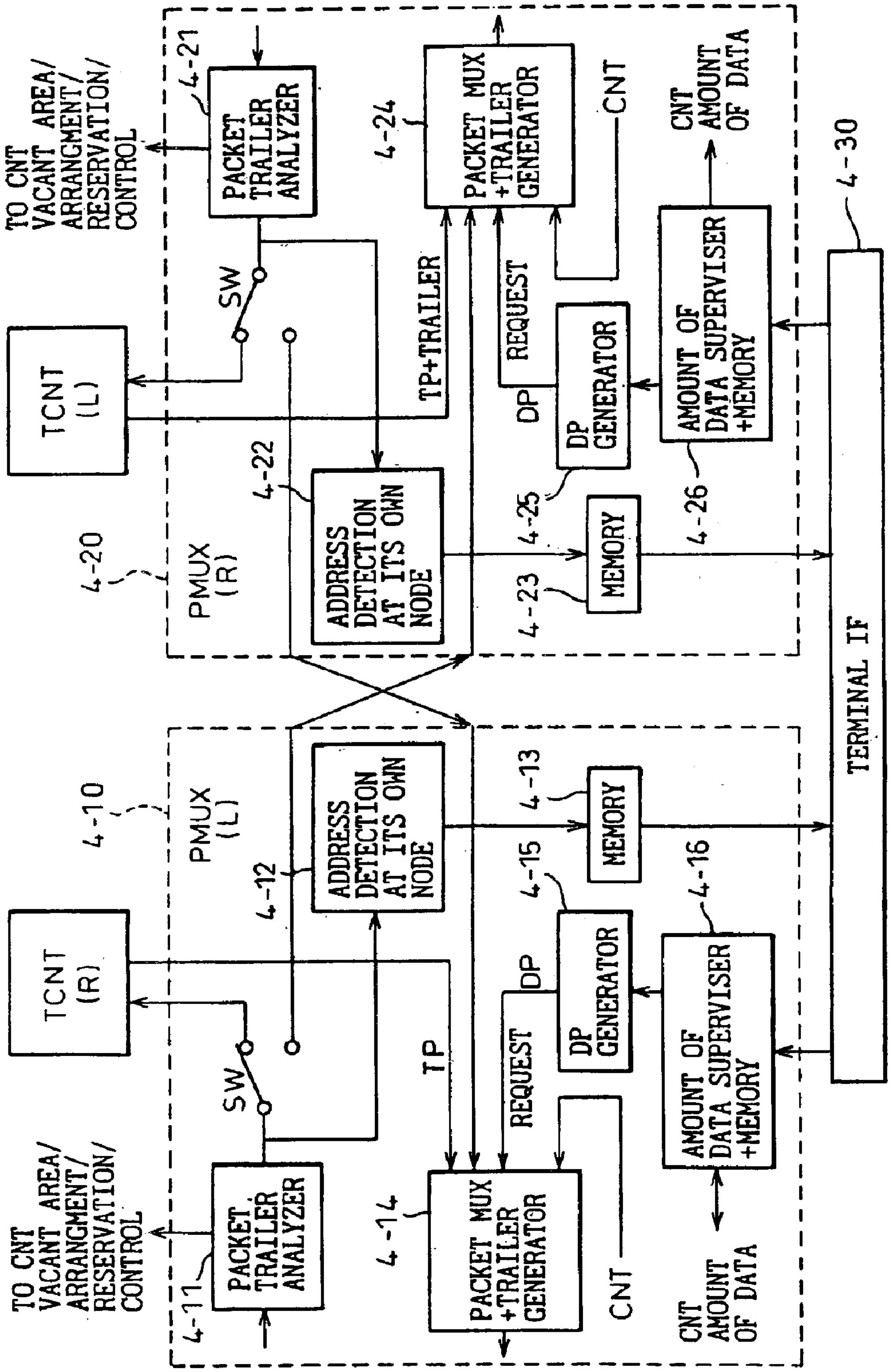
FIG. 4 shows a detailed structure of a packet multiplexer (PMUX)

FIG. 4 shows a detailed structure of the packet multiplexer (PMUX). The transmission apparatus of each node includes a left packet multiplexer (PMUX-L) 4-10 and a right packet multiplexer (PMUX-R) 4-20. This drawing shows connection relationship between the PMUX-L and the PMUX-R.

In the PMUX-L 4-10 and PMUX-R 4-20, packet trailer analyzers 4-11 and 4-21 acquire various information from the data of the packet trailer sent from a line interface (IF) 4-30.

In this case, there is various information, for example, vacant area(s) in storage(s) of the data packet in the packet trailer, a reservation reception of the transmission right, an arrangement of each node on the network line, and various control information. The packet trailer analyzers 4-11 and 4-21 analyze these information and extract predetermined information, and the extracted information are transmitted to the controller CNT.

The data in the packet trailer passes through the packet trailer analyzers 4-11 and 4-21, and is transmitted to either the TCNT-R and TCNT-L when the transmission apparatus operates as the TE, or the PMUX unit in another TE when the transmission apparatus operates as the IE, by switching a switch SW.

The controller CNT controls the operation of the switch SW. The CNT determines whether the transmission apparatus operates as the TE (master node) or as the IE (slave node), based on the alarm information informed from the line IF unit in accordance with the rule as mentioned below. The switch SW is switched to the TCNT-R and TCNT-L when it operates as the TE, and is switched to PMUX unit of another TE when it operates as the TE.

Address detectors 4-12 and 4-22 in its own PMUX unit detect the data packet having an address for its own unit from the data packet in the packet trailer, copy the data of the packet, and transmit the data to a terminal IF 430 through memories 4-13 and 4-23.

When the PMUX unit operates as the IE (slave), each packet trailer output from the PMUX-L 4-10 and PMUX-R 420 is delivered to the TCNT-R and TCNT-L in order to abandon all of the packet trailers. Further, the token packets TP, which are issued from the TCNT-R and TCNT-L, are input to each packet multiplexing (PM) trailer generator 4-14 and 4-24.

Each PM trailer generator 4-14 and 4-24 multiplexes the following items, i.e., the data packet DP sent from the terminal IF unit 4-30 and packeted by data packet generators 4-15 and 4-25, the token packet TP from the TCNT or the packet trailer from the PMUX unit in another unit, and the request information sent from the controller CNT, in order to provide the packet trailer and to transmit them to the line IF unit.

In this case, an amount of the transmission data from the terminal IF unit 4-30 is measured by each data amount checking/storing unit 4-16 and 4-26, and is informed to the controller CNT. The controller CNT prepares the TR request based on the amount of the transmission data, and inputs the TR request to the PM trailer generators 4-14 and 4-24 provided in the direction opposite to the data transmission.

Each PM trailer generator 4-14 and 4-24 stores the token packet TP from the TCNT at the head of the packet trailer when it operates as the TE (master node), and multiplexes the data packets DP, which are output from the DP generators 4-15 and 4-25, in the following data packet area in accordance with the instructions from the controller CNT.

When the PMUX unit operates as the IE, it selects the packet trailer transmitted from another PMUX unit. Further, the PMUX unit multiplexes the TR request, which includes the amount of data calculated by the data amount checking/storing units 14-16 and 14-26 of the opposite side, with the token packet TP and the data packet DP included in the trailer.

The controller CNT determines as to whether its own node can transmit the transmission data based on the following information, i.e., the vacant area information in the packet trailers which are recognized by the packet trailer analyzers 4-11 and 4-21 from the data included in the packet trailers, the TR reservation-reception information of its own node, and the data amount information which are held in the data amount checking/storing units 14-16 and 14-26. When the controller CNT determines the transmission, the controller CNT instructs the multiplexing of the data packet of its own node to the PM trailer/generators 4-14 and 4-24.

Figure 5:
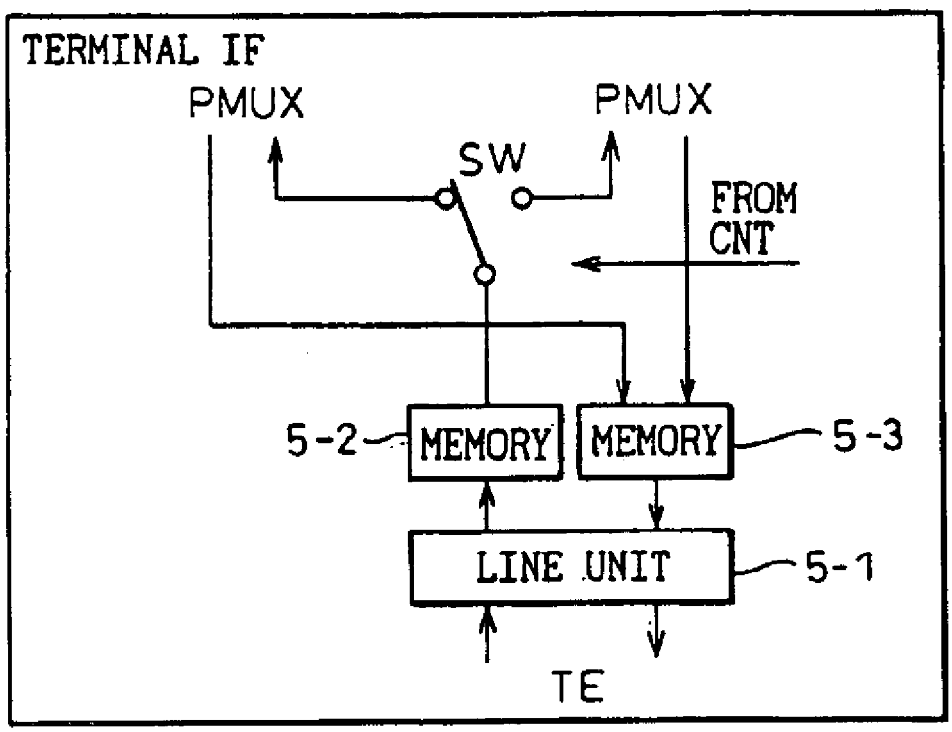
FIG. 5 shows a detailed structure of a terminal interface (IF) unit.

FIG. 5 shows a detailed structure of the terminal interface (IF) unit. As well as the line IF unit, the terminal IF unit includes a line unit 5-1 having a physical IF converter and a frame separator/generator, a memory 5-2 for storing the transmission data until transmission to the network line, a memory 5-3 for absorbing delay by storing the data received from both of the both-way network line, a switch SW 5-4 for switching the PMUX unit of the destination so as to transmit the transmission data on any one line in the two-way network line.

The switch SW 5-4 is switched in such a way that the direction of the destination node on the two-way network is detected based on a destination node address of the transmission data and node arranging information held in the controller CNT. Further, the output of the transmission data storing memory 5-2 is switched to the PMUX unit to be directed.

Figure 6A:
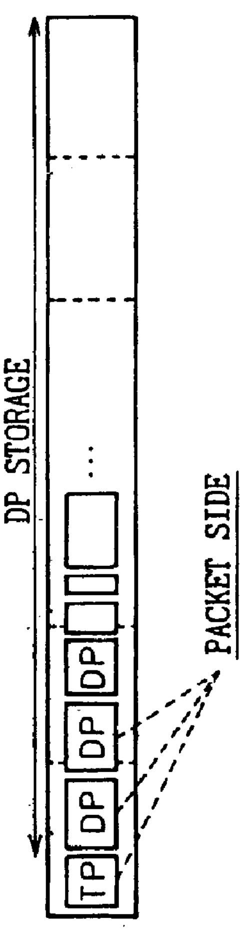
FIGS. 6A to 6C show structures of a packet trailer delivered on the transmission line.
Figure 6B:
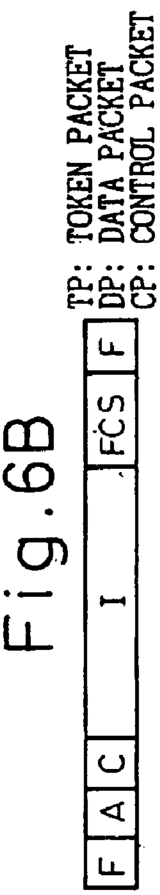
Figure 6C:
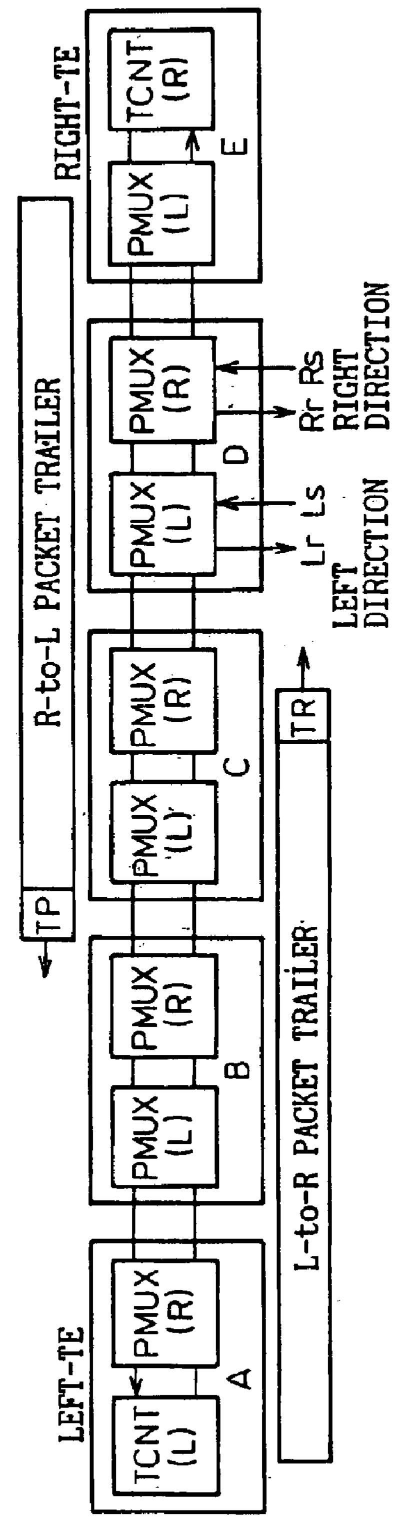

FIGS. 6A to 6C show structures of the packet trailer delivered on the transmission line. The packet trailer is prepared by the trailer generator as shown in FIG. 6A. A token packet TP is provide to a head of the trailer, and a plurality of data packets DP, each of which is transmitted from the node, are sequentially provided following to the token packet TP. Further, a control packet CP is inserted after the token packet TP at need in order to perform the control of the communication between nodes.

Each packet has a transmission format which has been already defined as, for example, a HDLC (high level datalink control procedure) format. The format includes a flag field F, an address field A, a control field C, an information field I, and a frame-check sequence field FCS, as shown in FIG. 6B.

The control field C stores identifying information which indicate kinds of packets, such as the token packet TP, the data packet DP, or the control packet CP, and priority information which indicate priority orders of the transmission data. Further, the controller CNT performs the priority control based on the priority order of the transmission data in order to realize a network, corresponding to data communication, in which the real-time response has been considered as an important characteristic.

A logical structure of the communication line and the direction of the packet trailer to be delivered are shown in detail in FIG. 6C. The logical structure includes a linear topology that connects the left terminal equipment (TE) A to any intermediate equipments (IE) B to D and the right terminal equipment (TE) E, on the both-way transmission line. In this case, even if each node is physically connected to one another in the form ring-like configuration, any one node is determined as either left TE or the right TE based on a TE determining rule as explained in detail below. As a result, the logical structure of the communication line can be automatically provided as shown in FIG. 6C.

In FIG. 6C, the packet trailer directed to the left TE (A) is called "R-to-L packet trailer, and the packet trailer directed to the right TE (E) is called "L-to-R packet trailer". Each node loads the packet of the transmission data directed to the left TE (A) on the R-to-L packet trailer, and the packet of the transmission data directed to the right TE (E) on the L-to-R packet trailer.

For example, the packet of the transmission data from the node B to the node D is loaded on the L-to-R packet trailer, and the packet of the transmission data from the node C to the node B is loaded on the R-to-L packet trailer. Accordingly, it is possible to independently transmit the data packet on each transmission line in the corresponding direction so that it is possible to effectively use a two-way transmission line without any loss and to validly utilize the transmission capacity of the transmission line. In this case, a multi-cast data packet to be simultaneously transmitted to all of nodes can be realized by loading it on both packet trailers.

Figure 7:
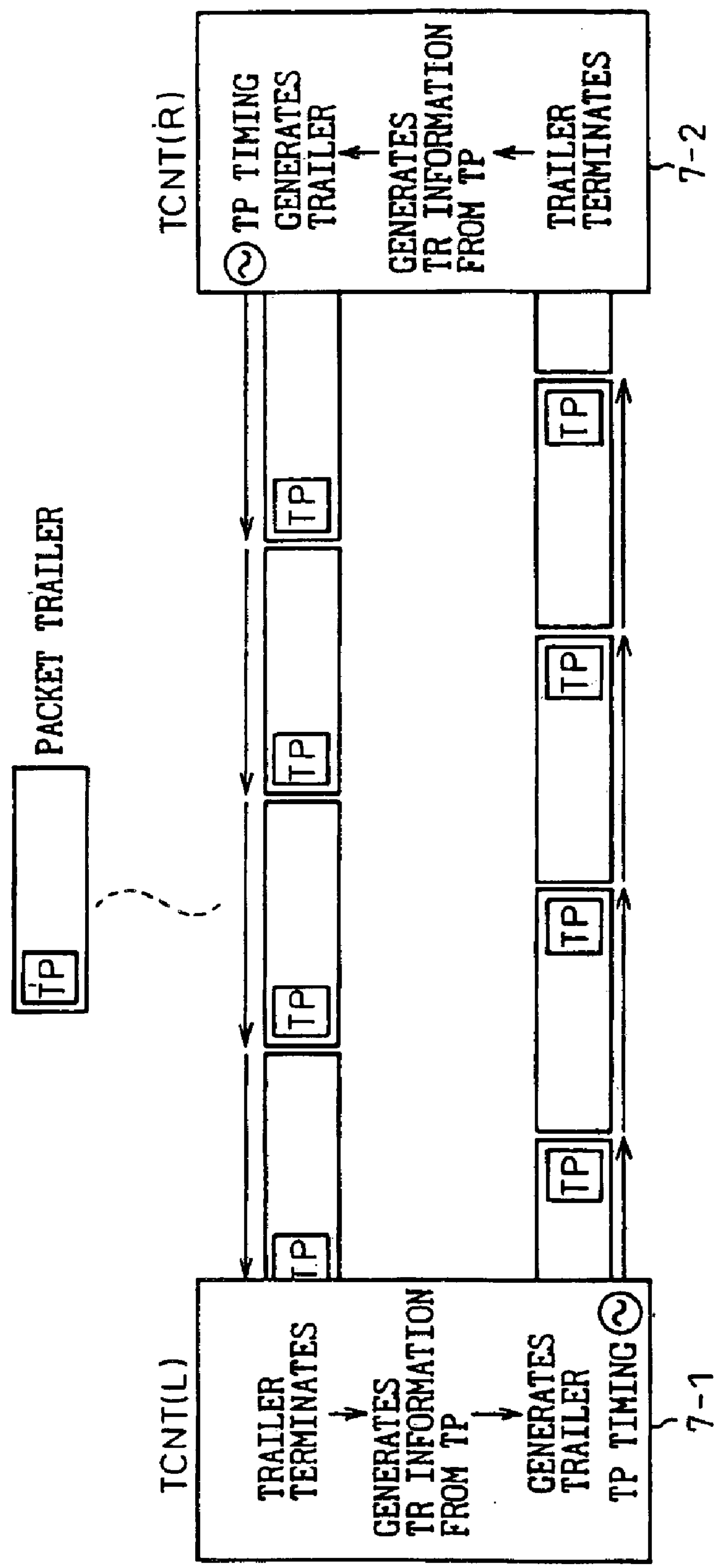
FIG. 7 shows delivery of the packet trailer and operation of the token controller.

FIG. 7 shows delivery of the packet trailer and operation of a token controller. The packet trailer is sequentially transmitted from a left token controller (TCNT-L) and a right token controller (TCNT-R) without overlapping each other on the network transmission line. When each packet trailer arrives at the opposite TCNT, the packet trailer is terminated and abandoned by the destination TCNT.

The TCNT-L (7-1) and TCNT-R (7-2) abandons the data packet DP included in the packet trailer when it arrives at these controllers 7-1 and 7-2, extracts the transmission right (TR) request from the token packet TP, and generates a new token packet TP including a new TR information prepared based on the TR request.

Further, the transfer timing of the token packet TP is determined based on a frame timing signal sent from the line IF unit, and the packet trailers that load the above token packet TP are sequentially transmitted on the network line through the PMUX unit at the above transfer timing.

Figure 8A:
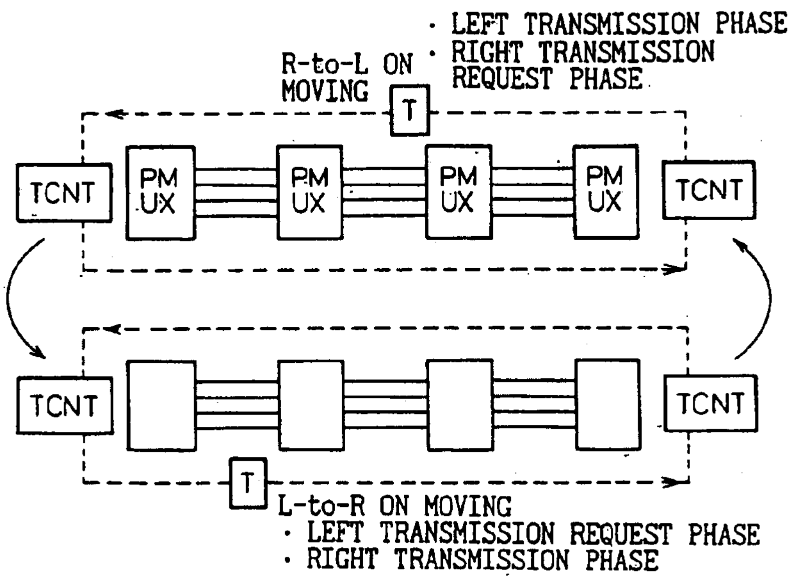
FIGS. 8A to 8C show transmission of data packet from each node.
Figure 8B:
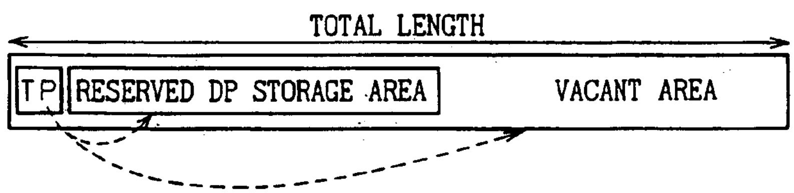
Figure 8C:
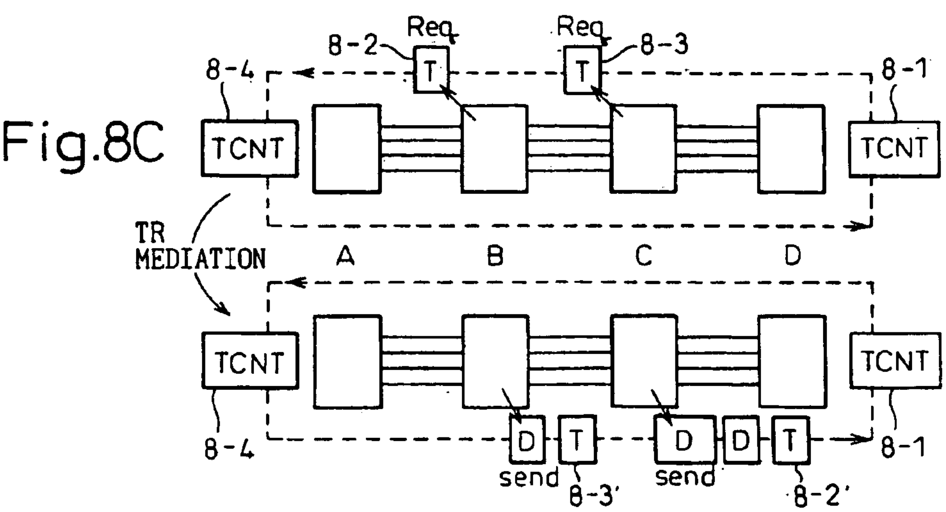

FIGS. 8A to 8C show transmission of data packet from each node. FIG. 8A shows the token packet T which goes around the PMUX units. After the token packet T of the packet trailer moving from right to left, the data packet directed to the left is loaded (this is called a left-direction transmission phase). Further, the TR request for transmitting the data packet directed to the right is added to the above token packet T of the packet trailer moving from right to left (this is called a right-direction TR request phase).

As well as the above, after the token packet T of the packet trailer moving from left to right, the data packet directed to the right is loaded (this is called a right-direction transmission phase). Further, the TR request for transmitting the data packet directed to the left is added to the above token packet T of the packet trailer moving from left to right (this is called a left-direction TR request phase).

That is, when transmitting the data packet, the TR request is loaded on the token packet T at an opposite direction to be transmitted. The token controller TCNT that received the TR request mediates the transmission right (TR) between nodes based on the priority orders, previously ensures an area to be loaded for the data packet DP of the node to which the transmission right is applied, and prepares and transmits the packet trailer having a reservation area for storing the data packet DP as shown in FIG. 8B. As explained above, it is possible to realize the data communication based on the QOS (communication service quality) and good real-time characteristic by mediating the TR and by ensuring the reservation area.

FIG. 8C shows transmission of the data packet D directed to the right. The token packets 8-1 and 8-2, which are directed to the left and initialized by the right token controller (TNCT) 8-1, are delivered on the left transmission line. When the IE nodes B and C request the data packet D to be transmitted to the right direction, the nodes B and C loads the TR request information "Req" on the token packets (T) 8-2 and 8-3 moving to the left. The "Req" includes a its own node address, a priority order, and a size of transmission data.

Based on the "Req", the left token controller (TCNT) 8-4 performs the mediation process of the transmission right (TR). As a result of mediation, the determined TR and the ensured reservation area are loaded from the left TCNT 8-4 to the right token packets (T) 8-2' and 8-3'. The nodes B and C determine an amount of the transmission data in accordance with the information of the reservation area in the right token packets (T) 8-2' and 8-3'. The data transmission directed to the right is performed by loading the data packet D of the transmission data into the reservation area in the packet trailer.

Figure 9:
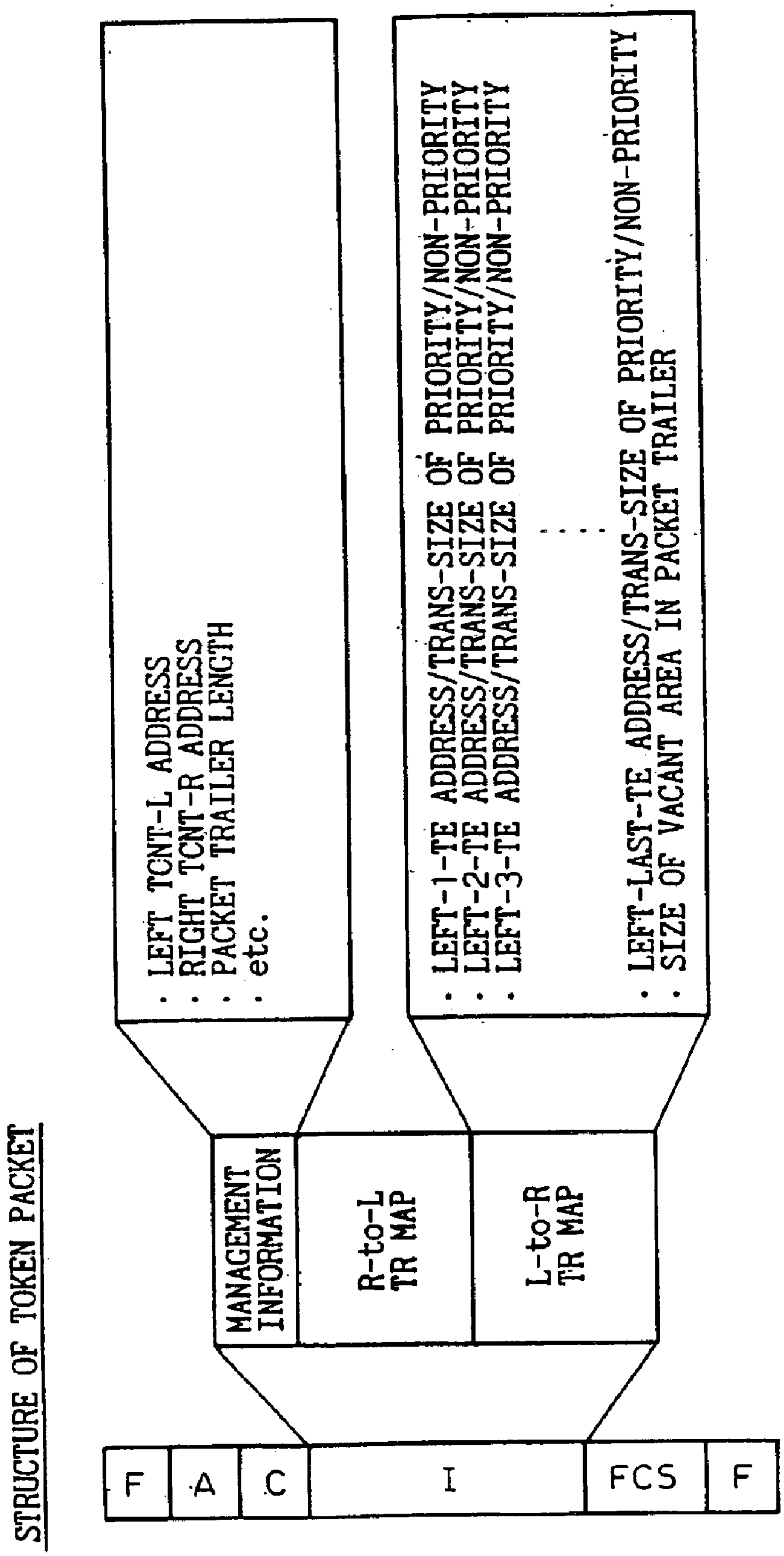
FIG. 9 shows one example of a structure of the token packet.

FIG. 9 shows one example of a structure of the token packet. The information field I in the token packet stores management information, a R-to-L transmission right (TR) map, and a L-to-R transmission right map. The management information includes addresses of the left TE and the right TE, a length of the packet trailer, etc. The L-to-R TR map includes an address of each right TE, a priority transmission size, a non-priority transmission size, etc. Similarly, the R-to-L TR map includes an address of each left TE, a priority transmission size, a non-priority transmission size, etc.

Figure 10:
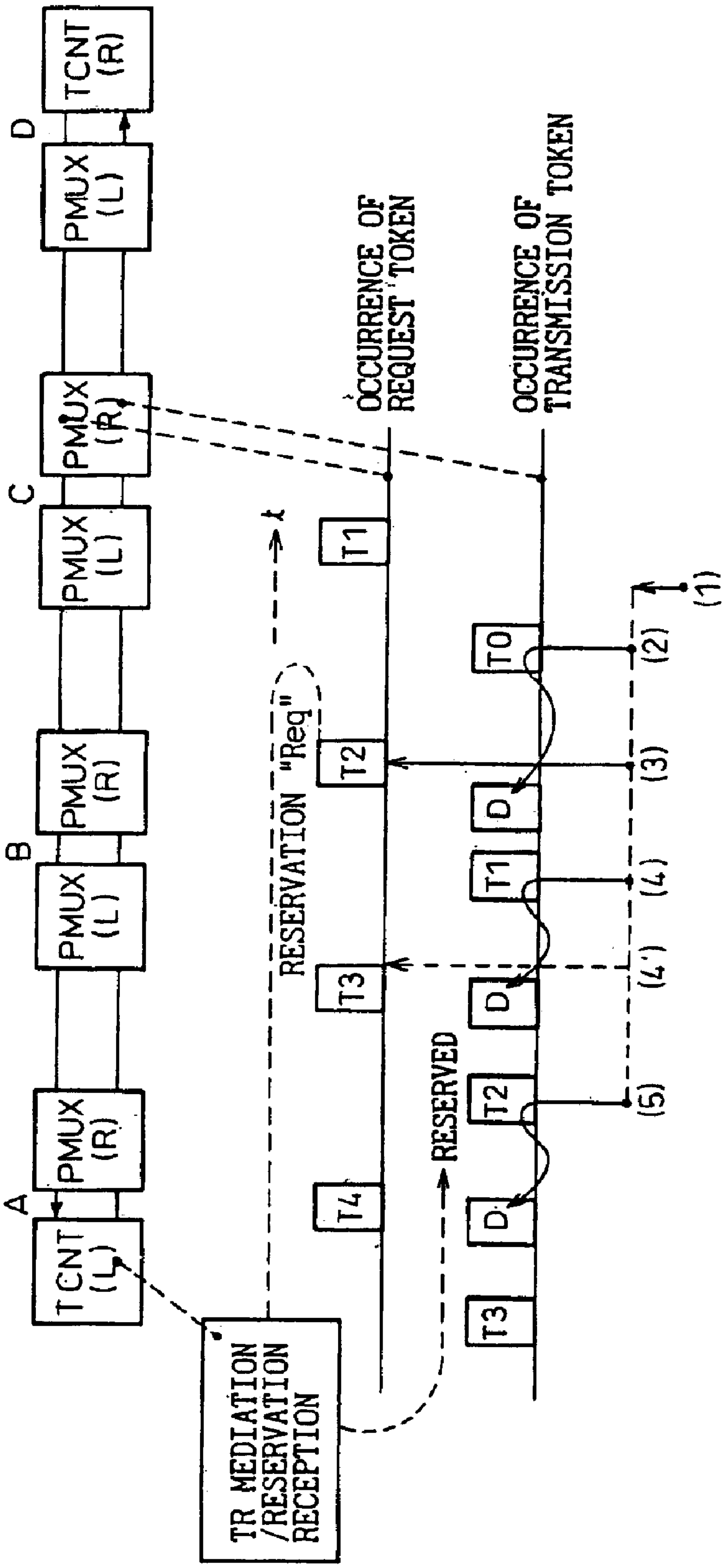
FIG. 10 shows transmission rules of the data packet in each node.

FIG. 10 shows transmission rules of the data packet in each node. For example, when the data transmission request directed to the right is generated from the intermediate equipment (IE) C, the IE (C) waits for arrival of the token packet directed to the left in order to perform the TR reservation request, and waits for arrival of the packet trailer directed to the right (see step (1)).

When the IE (C) previously detects arrival of the token packet TP in the packet trailer directed the right (see step (2)), the IE (C) checks whether there is a vacant area(s) in the packet trailer. When there is the packet area in the packet trailer, the IE (C) acquires the vacant area so that it is possible to transmit the data packet D (this is called "non-reservation transmission").

On the other hand, when the data packet has not yet transmitted, the IE (C) detects arrival of the token packet T2 directed to the left (see step (3)), and adds the TR reservation request to the token packet T2. Further, the token packet T2 arrives at the left TE (A), and the TR mediation and reservation reception are performed in the TE (a). Further, the packet trailer including the token packet T2 is transmitted to the right. When the IE (C) detects the token packet T1 directed to the right until the token packet T2 arrives at the IE (C) (see step (4)), the IE (C) acquires the vacant area when there is the vacant area in the packet trailer of the token packet T1, so that it is possible to transmit the data packet D (this is called "non-reservation transmission after reservation").

Even if the token packet T3 directed to the left comes at the next of the token packet T2 that has already performed the TR reservation request (see step (4')), it is impossible to perform the TR reservation request twice for the token packet T3 (this is called "inhibition of over-booking").

That is, when the arrival of the token packet T2 directed to the right, in which the reception of the previous TR reservation request has been already performed, is detected in the IE (C) (see step (5)), the IE (C) stores the data packet D in the reservation area of the packet trailer and transmits the data packet D (this is called "reservation transmission").

In this case, when the data packet D has already been transmitted based on the non-reservation transmission after reservation (see step (4)), and when there are no transmission requests of the remaining data, the IE (C) cancels the reservation for the token packet T2 directed to the right which has already been reserved and delivers the reservation area (as a vacant area) to the IE downstream. When there are transmission requests for the remaining data, a remaining data packet D can be transmitted by using the reservation area provided by the TR reservation request.

Further, when each IE receives the data packet for its own node, the IE abandons the data packet, changes the area occupied by data packet to the vacant area, and delivers the vacant area to the IE downstream. As a result, it is possible to effectively utilize the network transmission line.

Further, when transmitting the packet by adding the TR reservation request to an attribute of the request indicating the priority (i.e., priority/non-priority), the TR reservation request having the "priority" can be preferentially received based on the TR mediating process of the token controller, even if the TR reservation requests are collected over the capacity of the token packet.

Accordingly, when the data packets are transmitted in the communication service in which the real-time characteristic is important, the transmission right is preferentially provided to the data packet by transmitting the TR reservation request having the "priority" so that it is possible to provide good communication service without delay of the data transmission, abandonment of the transmission data, and no damage for the real-time characteristic.

On the other hand, the TR reservation request having "non-priority" is rejected at the reception of the TR mediating process of the token controller when the TR reservation requests are collected over the capacity of the packet trailer, and the data transmission to be requested is abandoned or waited. Accordingly, it is possible to utilizes the above in communication using protocols, such as a TCP (Transmission Control Protocol) in which the severe real-time characteristic is not required and has a procedure for requesting a re-transmission when the data has been abandoned.

Based on the above transmission rule and the TR mediating process, the reservation area, for storing the transmission data for the node to which the TR is applied, is previously ensured in the packet trailer and the data transmission is performed by effectively utilizing the vacant areas except for the reservation area. By adding the attributes of the TR request indicating the priority to the data, it is possible to perform effective data communication by fully using the transmission capacity for two ring-transmission lines, and to preferably apply the invention to a media communication in which the real-time characteristic or the high quality characteristic is important.

Figure 11:
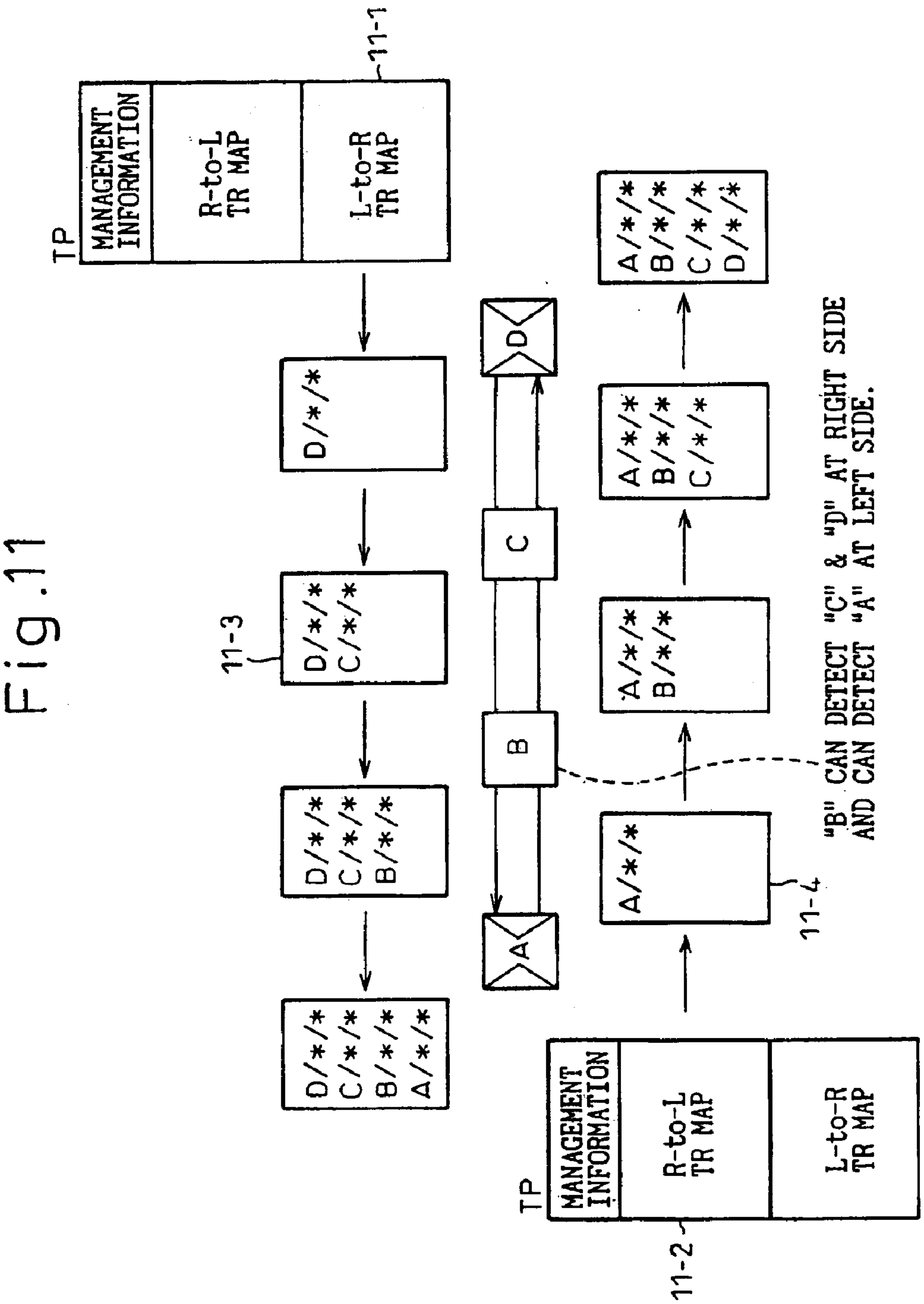
FIG. 11 shows procedures for recognizing arrangement of nodes.

Next, FIG. 11 shows procedures for recognizing an arrangement of nodes. Each node recognizes a node arrangement based on the transmission (TR) map of the token packet (TP). As shown in FIG. 11, the L-to-R TR map 11-1 for the token packet directed to the left and the R-to-L TR map 11-2 for the token packet directed to the right include a node-arrangement storing unit.

Further, each node stores sequentially its own address from the head in the node-arrangement storing unit from the TE node of the sending side of the token packet (TP), and transfers the token packet (TP) to the next node. Further, each node reads the node-arrangement information so that it is possible to recognize a state of arrangement of the node.

For example, since the addresses of the nodes D and C are stored in the L-to-R TR map 11-3 of the token packet (TP) directed to the left, the node B can recognize that the nodes C and D are arranged at the right side. Further, since the address of the node A is stored in the R-to-L TR map 11-4 of the token packet (TP) directed to the right, the node B can recognize that the node A is arranged at the left side.

As explained above, since each node recognizes the arrangement of the node, each node can determine the direction of the token packet to transmit the TR reservation request, and the direction of the packet trailer to store the data packets when each node transmits the data packets to the node of the destination.

Next, the RAS function will be explained below. The connection paths can be automatically and adaptively switched based on the RAS function when the failure has occurred. As explained above, in the conventional parallel—transmission/reception selecting method and the loop-back method, one of the double-ring transmission lines is provided as the stand-by line so that it is impossible to effectively utilize the transmission line at the normal state. In this case, however, it is possible to communicate with another by using the standby line when the failure has occurred.

On the other hand, in the present invention, the data communication is performed by using the two-way network transmission line at the normal state so that it is possible to effectively utilize the network transmission line, and the network paths are adaptively switched when the failure has occurred so that it is possible to communicate with another without any trouble.

Each node supervises in real time the states of the reception of the transmission frames and of the abnormal transmission at its own node, and communicates the information supervised in each node. As a result, each node determines whether its own node should operate as the TE i.e., a master node) or the IE (i.e., a slave node) in accordance with the following switching rule of the network path, and sets the network path in which the fault line can be avoided.

The following explanations are given to the switching rules RAS-r1 to RAS-r7.

RAS-r1 is that the node in which the data frames have not arrived from upstream operates as the TE (i.e., a master node);

RAS-r2 is that the master node operates as the IE (i.e., a slave node) when it receives a master-informing frame from another master (i.e., another different master) upstream on the both transmission lines;

RAS-r3 is that the master node maintains the master when its own node has a high order, and is changed to the slave when its own node has a low order, in accordance with a previously determined order between nodes, when the master-informing frame from another master (the same master each other) upstream on both transmission lines (i.e., a state of double master);

RAS-r4 is that a master-inviting frame is transmitted downstream on the opposite transmission line having the opposite direction in which the data frames are not incoming;

RAS-r5 is that the node which has received the master-inviting frame from only upstream on one of the transmission lines operates as the master;

RAS-r6 is that the node which has received the master-inviting frame from upstream on both transmission lines (the master adjacent to both nodes) is not operated as the master; and RAS-r7 is that the above rule RAS-r4 is released when the data frame is arriving from upstream, and the transmission of the master-inviting frame is stopped.

FIG. 12 is a table for switching between the master and the slave in accordance with the switching rule. In=#0 and In=#1 indicate inputs from each of both transmission lines. In the In=#0 and In=#1, there are three cases, i.e., the data frame being not arrived, the master-informing frame being arrived from the master nodes "m" and "n", and the master-informing frame and the master-inviting frame being arrived from the master nodes "m" and "n". The master/slave state of the node is changed in accordance with the switching rules RAS-r1 to RAS-r7 as shown in the above table.

Figures 13A, 13B, 13C, 13D, 13E, 13F, 13G:
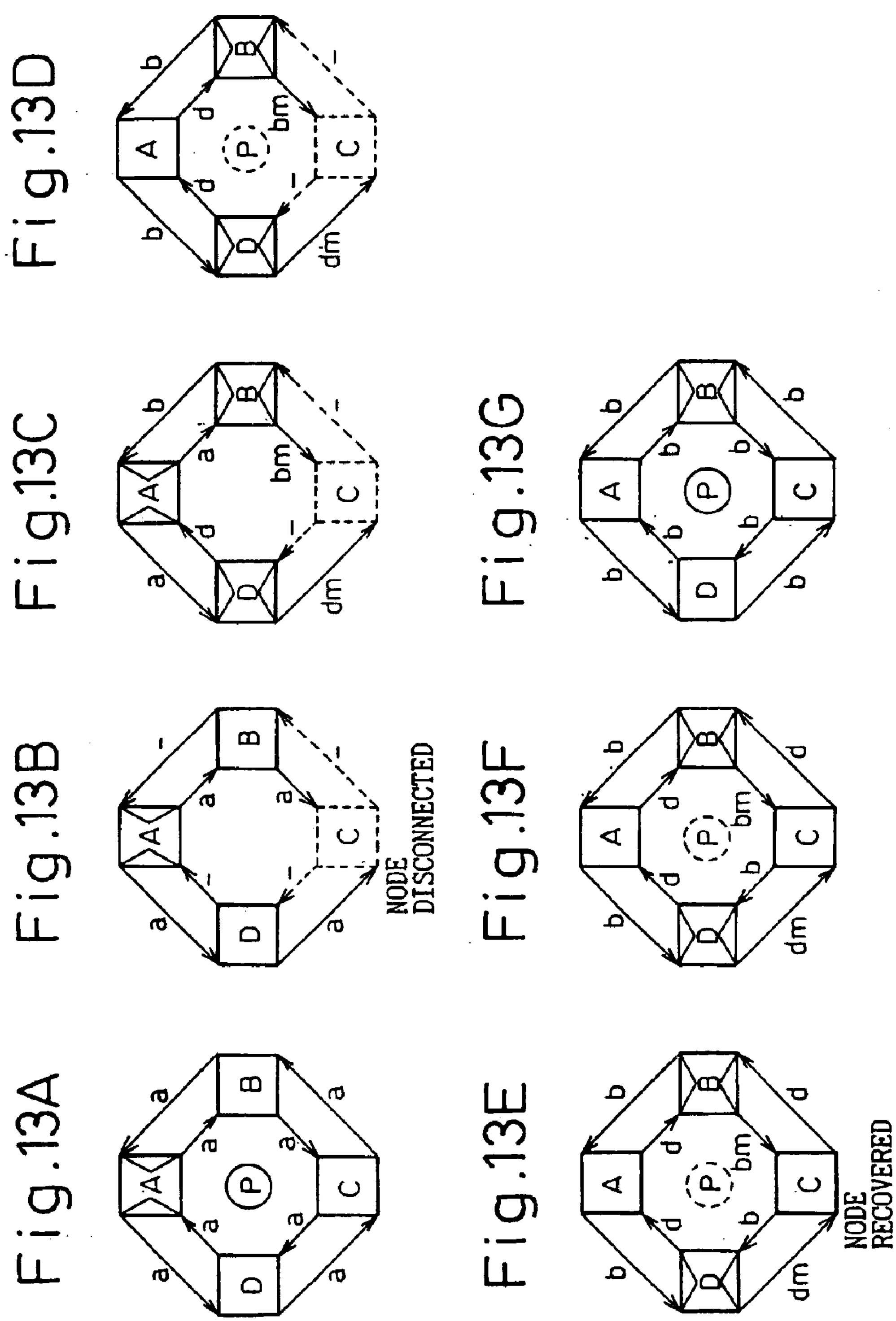
FIGS. 13A to 13G show detailed examples of the switching of network paths when any one node has disconnected.

FIGS. 13A to 13G show detailed examples of the switching of network paths when any one node has disconnected. In FIG. 13A, the node A is the TE (master node) and the remaining nodes B to D are the IE (slave node). Further, "a" denotes the master-informing frame indicating the node A being the TE (master node), and the master-informing frame "a" is communicated between nodes as shown in FIG. 13A.

In FIG. 13B, when the failure has occurred at the node C, the node C is disconnected from other nodes. In this case, the data frames are not transmitted from the node C to the nodes B and D. The nodes B and D become the TE (master node) in accordance with the switching rules RAS-r1 since the data frame has not arrived from upstream.

In FIG. 13C, each node B and D transmits the master-inviting frames "bm" and "dm" to the node C (i.e., to the downstream in the opposite direction in which the data frame is not incoming) in accordance with the switching rule RAS-r4. Since the node C has failed, it is not changed to the TE (master node) even if the master-inviting frames "bm" and "dm" are incoming thereto. In this case, each node B and D continues to transmit the master-inviting frames "bm" and "dm" to the node C.

On the other hand, since each node B and D operates as the master node, each node B and D transmits the master-informing frames "b" and "d" to the node A. As shown in FIG. 13D, the node A is changed to the IE (slave node) since the master-informing frames "b" and "d" have arrived from the different nodes upstream on both transmission lines. After the above steps, the nodes B and D operate as the TE (master node) and the node A operates as the IE (slave node).

In FIG. 13E, when the node c is recovered from the failure, since the master-inviting frames "bm" and "dm" have already arrived thereto in accordance with the switching rule RAS-r6, the node C does not operate as the TE (master node). That is, as shown in FIG. 13F, the node C transmits the master-informing frame "b" indicating the node B being the master node to the node D based on the master-inviting frame "bm" from the bode B. Further, the node C transmits the master-informing frame "d" indicating the node D being the master node to the node B based on the master-inviting frame "dm" from the bode B.

After the above steps, the master node B receives the master-informing frame from the nodes A and D, and the master node D receives master-informing frame "b" from the nodes A and C. The master nodes B and D are either maintained as the master when its own node has the high order, or it is changed to the slave when it has the low order, in accordance with the switching rules previously defined between the nodes, when these nodes receive the same master-informing frames from another node based on the switching rule RAS-r3.

In this case, it is assumed that the order of the node is defined as node A>node B>node C>node D. Since the master node B has an order higher than the master node D which is informed by the master-informing frame "d", the master node B is maintained as the master. On the other hand, since the master node D has the order lower than the master node B which is informed by the master-informing frame "b", the master node D is changed to the slave node. As a result, only the node B is the master so that it is possible to realize the normal state as shown in FIG. 13G.

Figures 14A, 14B, 14C, 14D, 14E, 14F, 14G, 14H:
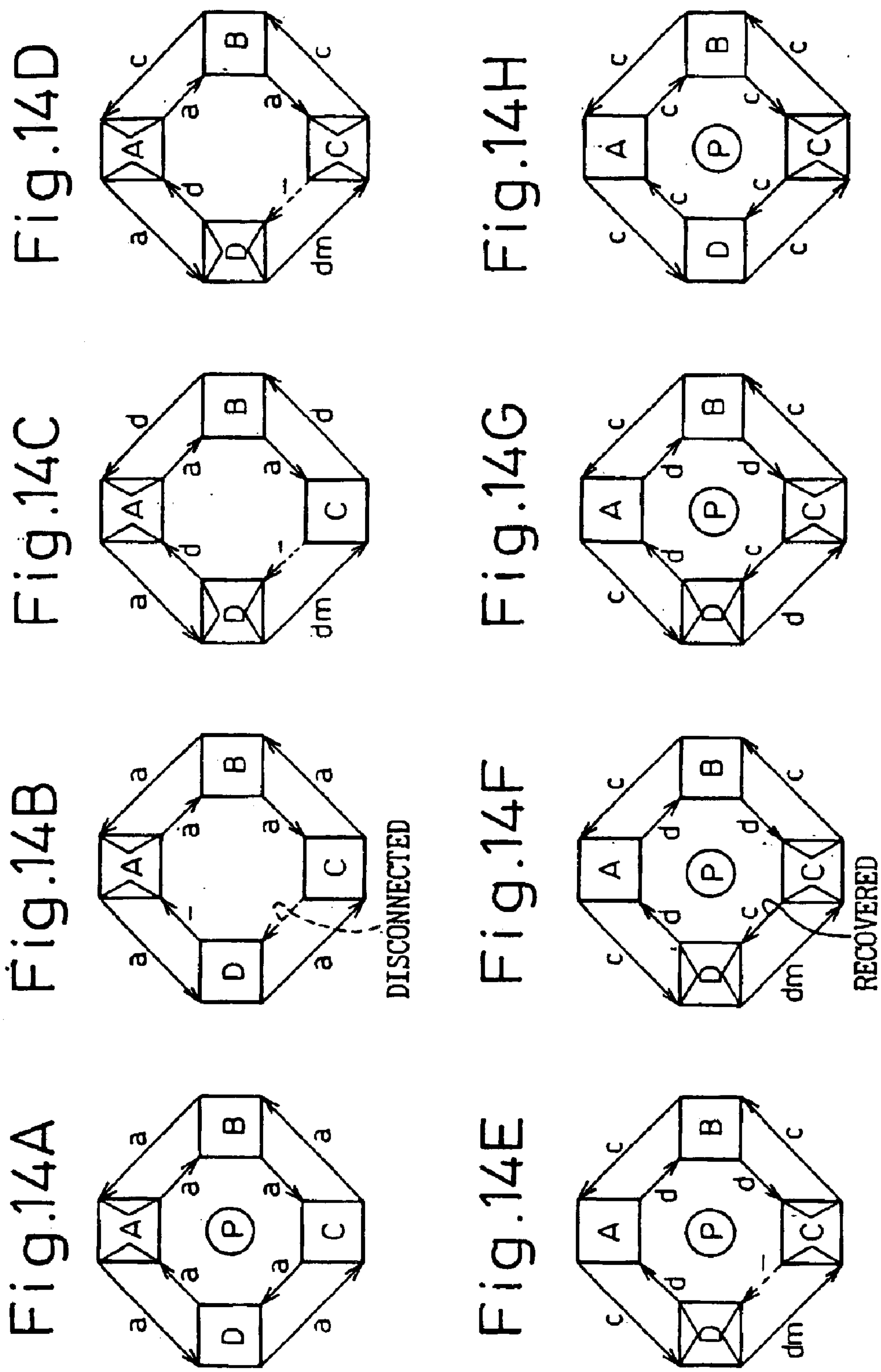
FIGS. 14A to 14H show detailed examples of the switching of network paths when any one of transmission lines has disconnected.

FIGS. 14A to 14H show detailed examples of the switching of network paths when any one of transmission lines has become disconnected. In FIG. 14A, the node A is the TE (master node), and the remaining nodes B to D are the IE (slave node) as the normal state. In FIG. 14B, the transmission line from the node C to the node D is disconnected.

In this case, the data frames are not transmitted from the node C to the node D. As shown in FIG. 14C, the node D becomes the TE (master node) since the data frames are not income from the upstream based on the rule RAS-r1, and transmits the master-informing frame "d" to the node A. Further, the node D transmits the master-inviting frame "dm" to the node C, i.e., to downstream on the opposite transmission line having opposite direction in which the data frames are not income, based on the RAS-r4. Further, the node C temporarily transmits the master-informing frame "d" to the node B.

As shown in FIG. 14D, the node C is changed to the master node based on the master-inviting frame "dm" in accordance with the switching rule RAS-r5, and transmits the master-informing frame "c" to the node B. The node B of the IE transmits the master-informing frame "c" to the master node A.

In FIG. 14E, the node A is changed to the slave node based on the rule RAS-r2 since the master-informing frames "c" and "d" have arrived from the nodes C and D at the upstream on the both transmission lines. Accordingly, the nodes C and D become the master nodes, and the nodes A and B become the slave nodes, as in the normal state.

In FIG. 14F, when the failure is recovered on the transmission line from the node C to the node D, the node C is changed to the master node based on the switching rule RAS-r5 in accordance with the master-inviting frame "dm" so that the master-informing frame "c" is transmitted from the node C to the node D. As shown in FIG. 14G, the node D stops transmission of the master-inviting frame "dm" to the node C based on the switching rule RAS-r7, and transmits the master-informing frame "d" to the node C.

In the above situation, the master node C receives the master-informing frame "d" from both transmission lines, and the master node D receives the master-informing frame "c" from both transmission lines. As shown in FIG. 14H, the node C having the higher order defined between the nodes based on the switching rule RAS-r3 is maintained as the master node. On the other hand, the node D having the lower order is changed to the IE (slave node). As a result, so that it is possible to realize the normal state as shown in FIG. 14H.

Figure 15A:
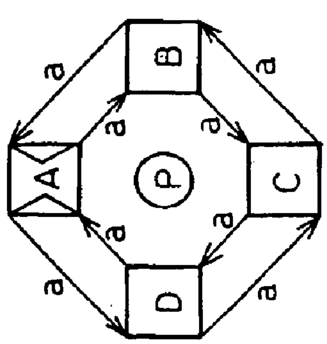
FIGS. 15A to 15E show detailed examples of the switching of network paths when the network is separated.
Figure 15B:
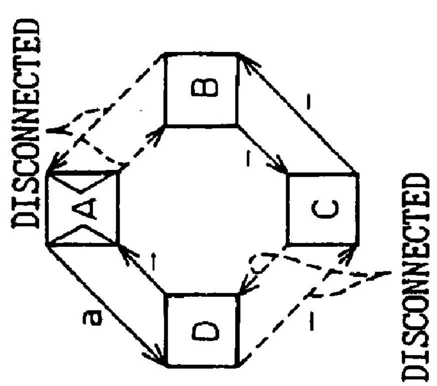

FIGS. 15A to 15E show detailed examples of the switching of network paths when the network is separated. In FIG. 15A, the node is the TE (master node), and the remaining nodes B to D are the IE (slave node). In FIG. 15B, both transmission lines between the nodes C and D and between the nodes A and B are disconnected each other.

Figure 15C:
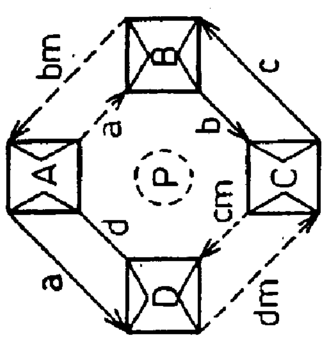

In this case, the data frames are not transmitted between the nodes C and D and between the nodes A and B so that the data frames do not arrive from upstream. Accordingly, as shown in FIG. 15C, all of nodes A to D are changed to the master nodes based on the switching rule RAS-r1.

The node A transmits the master-inviting frame “am” to the node B, the node B transmits the master-inviting frame “bm” to the node A, the node C transmits the master-inviting frame “cm” to the node D, and the node D transmits the master-inviting frame “dm” to the node C. These transmissions of the master-inviting frames are based on the switching rule RAS-r4.

Further, the node A transmits the master-informing frame “a” to the node D, the node D transmits the master-informing frame “d” to the node A, the node B transmits the master-informing frame “b” to the node C, and the node C transmits the master-informing frame “c” to the node B. In this case, the network of the nodes A and B is separated from the network of the nodes C and D as the normal state.

Figure 15D:
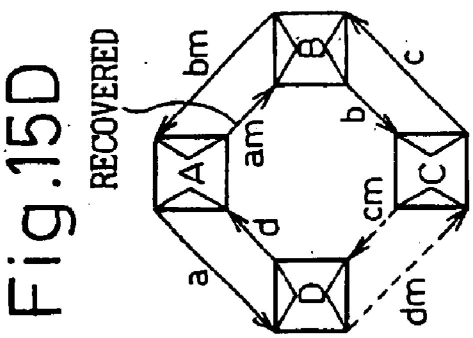

As shown in FIG. 15D, when the transmission line is recovered between the nodes A and B, since the data frames are incoming from upstream, the nodes A and B stop the transmission of the master-inviting frames “am” and “bm” and transmit the master-informing frames “a” and “b”.

Figure 15E:
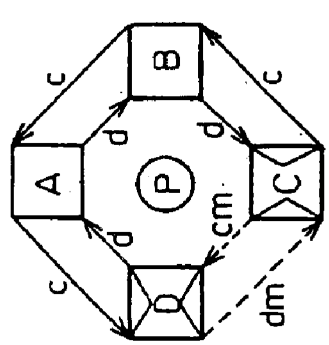

As shown in FIG. 15E, the master node A is changed to the slave node based on the switching rule RAS-r2 since the master-informing frames “b” and “d” are incoming from the different nodes B and D to the node A. Further, master node B is changed to the slave node based on the switching rule RAS-r2 due to the master-informing frames “c” and “d”. Accordingly, as shown in FIG. 15E, the nodes C and D become the master nodes, and the nodes A and B become the slave nodes, as in the normal state.

As explained above, when a failure has occurred on the transmission line, each node autonomously switches the structure of the network paths based on the switching rules RAS-r1 to Ras-r7, and re-structures at real time the network paths between the normal transmission lines. As a result, it is possible to ensure the normal communication lines in the minimum state of the failure of the transmission line, and to realize data communication having the high reliability.

FIGS. 16A to 16D show embodiments in which the present invention is applied to a SDH (Synchronous Digital Hierarchy) network. An interface of the SDH is provided as the line IF unit, and an interface of a LAN (Local Area Network) is provided as the terminal IF unit.

Figure 16A:
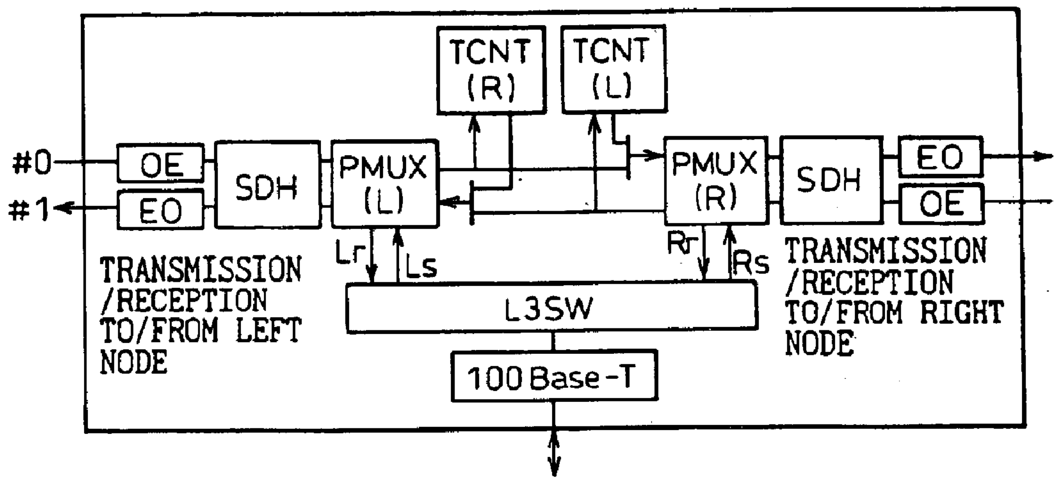
FIGS. 16A to 16D show embodiments in which the present invention is applied to a SDH network.

FIG. 16A shows a function block. The line IF unit includes an optical-to-electrical converter (OE), an electrical-to-optical converter (EO) and an SDH interface (IF) unit. The SDH IF unit performs generation and separation of the SDH frames. Further, the terminal IF unit includes a layer-three switch unit (L3SW) and a 100 Base-T interface unit (100 Base-T) which is connected to another 100 Base-T. The L3SW performs change of routes of the layer 3 (i.e., a network layer, an IP layer) in an internet protocol (IP) so that it is possible to realize the functions of a router.

Figure 16B:
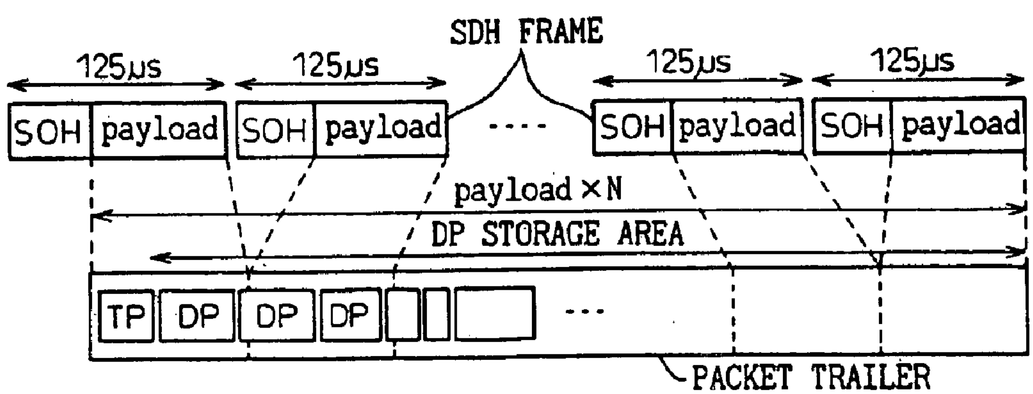

FIG. 16B shows one example of a structure of the packet trailer on the SDH network. The packet trailer is stored in a payload of each SDH frame, and is structured by coupling a plurality of payloads. The number N of the SDH frame for structuring the packet trailer is determined depending on a system. When the processing efficiency of the data is increased, the number N is set to a large value. On the other hand, when the delay of the data is decreased, the number N is set to a small value. As shown in the drawing, the token packet (TP) is provided at the head of the packet trailer, and the data packet (DP) is provided after the token packet (TP). The control packet (CF) is provided, if necessary.

In this case, each node address is replaced by an IP address, and a table including node arrangement information on the network is provided in the controller. The node-arrangement table stores arrangement information including paths directed to the left and right and the node IP addresses, and an IP address of the TE. Accordingly, it is possible to perform routing operations referring to the node-arrangement table. In the present invention, even if the network of a lower layer is a synchronous network, the packet trailer is structured. Since a variable data packet can be mounted on the packet trailer, it is possible to realize good relationship in the communication using the internet protocol (IP).

Figure 16C:
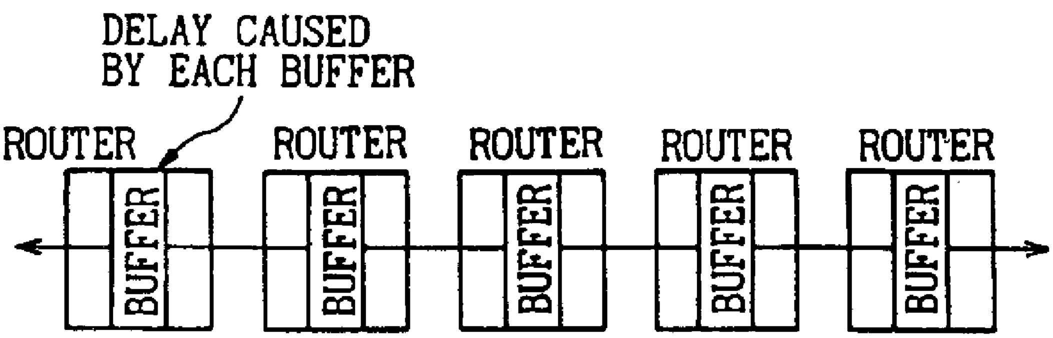
Figure 16D:
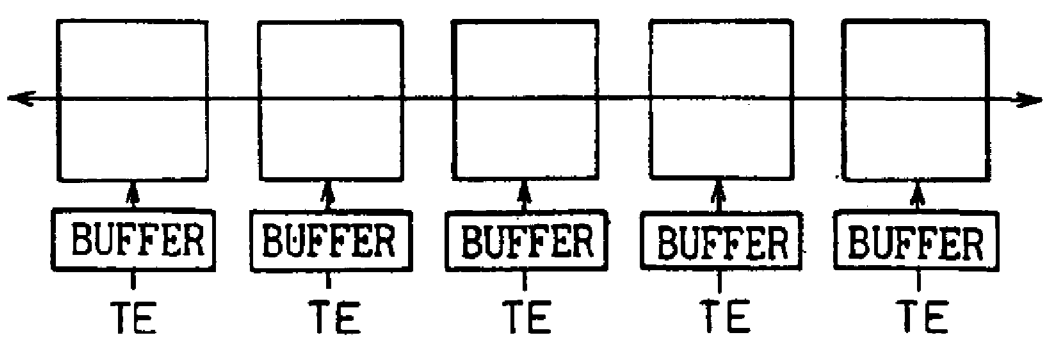

Further, as shown in FIG. 16C, in the case of a multistage-connection using general routers, since each router temporarily stores data to be delivered in a buffer and transmits them from the buffer to the next node, in general, the transmission delay is increased in each router. On the other hand, the transmission apparatus according to the present invention, since the buffer is provided only in the terminal equipment (TE), the transmission delay occurs only at the time when the TE transmits the data to the network through the buffer. Accordingly, there is no delay in the multistage-connection between the nodes.

In general, in the IP network, the multistage-connection is structured by ten to twenty stages of routers. Further, in a supervising system, one hundred to two hundreds stages may be required for the multistage-connection. In this case, there is a problem that the transmission delay occurs in each node. Accordingly, a network architecture using routers is not optimum for a system using a multistage-connection. The present invention can solve this problem. Further, it is possible to deal with the QOS on the lower layer by linking the priority information on the IP layer with the priority order of the request of the present invention.

Figure 17A:
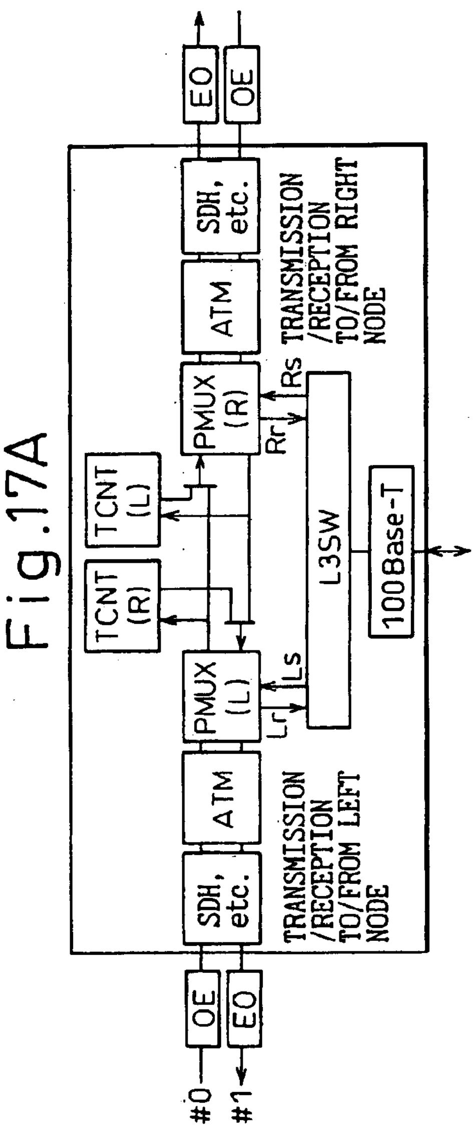
FIGS. 17A and 17B show structures of an ATM network according to an embodiment of the present invention.
Figure 17B:
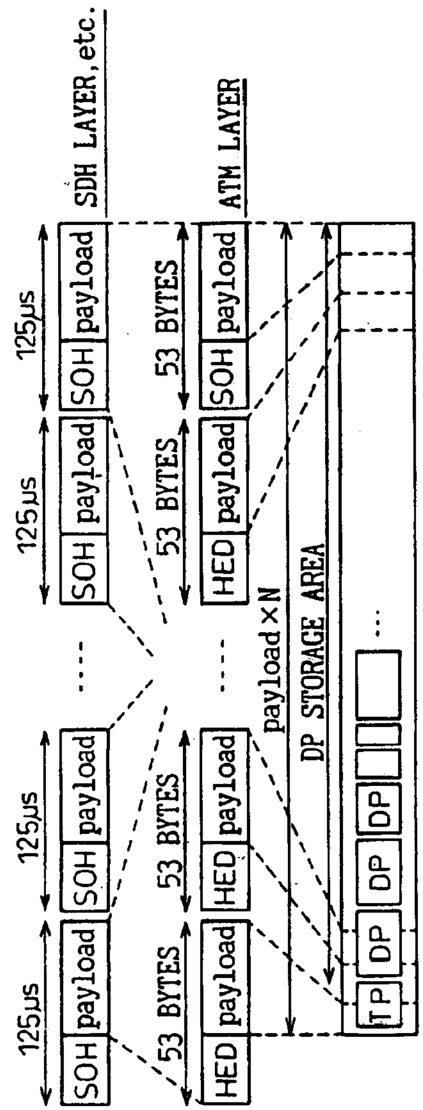

FIGS. 17A and 17B show structures of an ATM network according to an embodiment of the present invention. The line IF unit includes a function of an ATM (Asynchronous Transfer Mode) over SDH, and the terminal IF unit includes the function of a LAN interface. Further, if another network except for the SDH network is used, it is possible to provide an IF function of another network.

FIG. 17A shows a function block diagram. The line IF unit includes an optical-to-electrical converter (OE), an electrical-to-optical converter (EO), an SDH interface unit, and an ATM interface unit. The ATM interface unit prepares ATM cells and separates them, and transmits packets formed of ATM cells to the line IF unit of the SDH network.

Further, the TE interface unit includes a layer-3-switch unit (L3SW) and a 100-Base-T interface unit, and is connected to the TE having the 100-Base-T interface unit. Further, the route of the layer-3 (a network layer, an IP layer) of the internet protocol (IP) is separated in order to realize the function of the router.

FIG. 17B shows a structure of the packet trailer in the ATM network. The packet trailer is stored in the payload of each ATM cell. The packet trailer is structured by coupling a plurality of payloads. The number N of the ATM cell is determined depending on the system structure. The token packet (TP) is provided to the head of the packet trailer, and the data packet (DP) is provided after the TP. Further, the control packet (CP) is provided, if necessary. Further, a plurality of ATM cells are mapped on the SDH frame.

States of the frame reception and transmission that are necessary for realization of the RAS function are supervised by using the following signals, i.e., LOS (Loss Of Signal), LOF (Loss Of Frame), LOP (Loss Of Pointer) and P-AIS (Path-Alarm Indication Signal) in the SDH network, and by using the following signals, i.e., OCD (Out of Cell Delineation) and LCD (Loss of Cell Delineation) in the ATM network. The abnormal frame is detected by using these signals. Further, it is possible to realize a structure in which detects the out-of-cell delineation and determines abnormal reception of the frame. Further, the abnormal transmission in its own terminal can be detected by using MS-FERF and P-FERF (i.e., abnormal transmission in its own terminal) signals.

As explained above, according to the present invention, the transmission capacity of the two-way transmission line can be fully utilized, the utilization efficiency of the transmission line can be improved by transmitting the transmission data only to the direction of transmission, and the transmission capacity can be utilized twice compared to the conventional ring-type network so that it is possible to provide an economical system.

Further, it is possible to provide media communication in which the real-time characteristic is considered as the important matter, by previously reserving a data storage area at the direction of the transmission and ensuring the area. Further, each node dynamically acquires the data storage area in a non-reserved vacant area and transmits the area so that it is possible to raise the utilization efficiency of the transmission capacity and to improve the quality of the network.

Still further, it is possible to provide the media communication having high real-time characteristic and the communication corresponding to the QOS (service quality class) by attaching the priority order to the transmission request of the data packet. Further, the transmission apparatus according to the present invention includes the buffer memory in each terminal for adjusting the output timing to the network transmission line, and the packet trailer can be relayed without storing the packet trailer in the buffer memory, so that it is possible to reduce the delay in the transmission of data due to the multistage-connection.

What is claimed is:

1. A method for transmitting data in a linear-type or ring-type network structured by a plurality of nodes and two-way transmission lines each connecting between adjacent nodes;

wherein each node operates as a left terminal equipment, a right terminal equipment, or an intermediate equipment; the left and right terminal equipments prepare token packets each including a transmission right and packet trailers including data packet storage area; the left terminal equipment transmits the packet trailers on a right direction line of the two-way transmission line; and the right terminal equipment transmits the packet trailers on a left direction line of the two-way transmission line;

wherein, when a request for transmission for transmitting data packets to the right direction is generated by the right terminal equipment, each intermediate equipment writes a request for transmission in a token packet of a packet trailer on the left direction line; and when a request for transmission for transmitting data packets to the left direction is generated by the left equipment, each intermediate equipment writes a request for transmission in a token packet of a packet trailer on the right direction line; and each intermediate equipment performs the request for transmission;

wherein, when the request for transmission for transmitting data packets to the right direction is generated, the right terminal equipment prepares a packet trailer having data packet storage area to ensure a reservation area for each intermediate equipment, based on the request for transmission of the intermediate equipment, which is written in the token packet of the packet trailer prepared by the right terminal equipment, and when the request for transmission for transmitting data packets to the left direction is generated, the left terminal equipment prepares a packet trailer having data packet storage area to ensure a reservation area for each intermediate equipment, based on the request for transmission of the intermediate equipment, which is written in the token packet of the packet trailer prepared by the left terminal equipment; and wherein each intermediate equipment which performed the request for transmission temporarily stores the data packet in the reservation area of the packet trailer, and transmits the data packet to a destination node.

2. A transmission apparatus provided in each of a plurality of nodes which are connected through two-way lines in a linear-type or ring-type network;

wherein the transmission apparatus in each node comprises a function to operate as either a terminal equipment or an intermediate equipment;

wherein the transmission apparatus, to operate as a terminal equipment, comprises:

means for preparing packet trailers each having a storage area to store token packets and data packets and for transmitting the packet trailers on the two-way transmission line toward another terminal equipment, means for receiving the packet trailers transmitted from the other terminal equipment over the two-way transmission line and for terminating the packet trailers, and means for storing a transmission rights in token packets of the prepared packet trailers, in which the transmission rights are applied to intermediate equipment, based on requests for transmission of the intermediate equipment written in the packet trailers transmitted from the other terminal equipment, and for transmitting the prepared packet trailers including the token packets toward the other terminal equipment; and wherein the transmission apparatus, to operate as the intermediate equipment, further comprises:

means for writing requests for transmission in token packets of the packet trailers transmitted by the other terminal equipment, and means for storing the transmission data in packet trailers in accordance with the transmission rights of the token packets including the requests for transmission written in the packet trailers prepared by the terminal equipment, and for transmitting the packet trailers prepared by the terminal equipment toward the other terminal equipment.

3. A transmission apparatus as claimed in claim 2, further comprising;

means for detecting abnormal reception of data frames transmitted from the two-way transmission line and abnormal transmission in its own apparatus;

means for switching the apparatus to an equipment operating as the terminal equipment when data frames are not received from the apparatus of an adjacent node, and for transmitting a terminal-reminding frame to the apparatus of the adjacent node in order to request operation as the terminal equipment; and means for determining whether the apparatus operates as either the terminal equipment or the intermediate equipment, based on a terminal-informing data frame informed from the apparatus transmitted from another node, and the terminal-reminding frame.

4. A transmission apparatus as claimed in claim 2, further comprising;

means for writing an address of its own node in the packet trailer delivered on the two-way transmission line; and means for reading other node addresses written by other nodes from the packet trailers delivered on the two-way transmission line and for recognizing an arrangement of nodes at the left and right directions, based on other node addresses.

5. A transmission apparatus as claimed in claim 2, further comprising;

means for preparing a plurality of independent packet trailers each including the token packet when the apparatus operates as the terminal equipment, and for transmitting the packet trailer which ensured a reservation area for the intermediate equipment which performed a request for transmission; and means for storing the transmission data in the reservation area in accordance with assignment of reservation based on the transmission right in the token packet and transmitting the data.

6. A transmission apparatus as claimed in claim 5, further comprising; means for storing the transmission data in a vacant area when the apparatus operates as the intermediate equipment, and when there is the vacant area in the packet trailer at the direction of data transmission, and for releasing the reservation area when the packet trailer having the reservation area assigned in accordance with the transmission right, and when there are no remaining transmission data.

7. A transmission apparatus as claimed in claim 2, further comprising; means for writing the transmission data adding a priority order when the apparatus operates as the intermediate equipment, and when the request for transmission is written in the token packet, and means for mediating the transmission right based on the priority order of the transmission data.

8. A transmission apparatus as claimed in claim 6, wherein, when the apparatus operates as the intermediate equipment, and when there is a vacant area in the packet trailer at the direction of the data transmission, the transmission data is sequentially written from a head position of the vacant area.

9. A transmission apparatus as claimed in claim 6, wherein when the apparatus operates as the intermediate equipment and receives the data for its own apparatus, the packet trailer is transmitted to the apparatus of the next node as the vacant area of the packet trailer in which the data was stored.

10. A transmission apparatus as claimed in claim 2, further comprising a terminal interface unit having an interface function for the terminal equipment which communicates the data, and the terminal interface unit includes a buffer memory for adjusting an output timing of the transmission data to the network.

* * * * *